United States Patent
Doljack

(10) Patent No.: US 7,599,167 B2
(45) Date of Patent: *Oct. 6, 2009

(54) ACTIVE BALANCING CIRCUIT MODULES, SYSTEMS AND CAPACITOR DEVICES

(75) Inventor: Frank Anthony Doljack, Pleasanton, CA (US)

(73) Assignee: Cooper Technologies Company, Houston, TX (US)

( * ) Notice: Subject to any disclaimer, the term of this patent is extended or adjusted under 35 U.S.C. 154(b) by 380 days.

This patent is subject to a terminal disclaimer.

(21) Appl. No.: 11/376,998

(22) Filed: Mar. 16, 2006

(65) Prior Publication Data

US 2008/0007891 A1    Jan. 10, 2008

Related U.S. Application Data

(63) Continuation-in-part of application No. 10/781,571, filed on Feb. 17, 2004, now Pat. No. 7,342,768.

(51) Int. Cl.
*H01G 4/38* (2006.01)

(52) U.S. Cl. ............ 361/328; 361/330; 361/58; 361/763; 361/765; 361/306.2; 365/52; 365/63; 365/203; 365/205

(58) Field of Classification Search ............ 361/328, 361/330, 763, 765, 58; 365/52, 63, 203, 365/205
See application file for complete search history.

(56) References Cited

U.S. PATENT DOCUMENTS

| | | | |
|---|---|---|---|
| 4,686,619 A | 8/1987 | Edwards | |
| 5,270,882 A * | 12/1993 | Jove et al. | 360/67 |
| 5,532,575 A | 7/1996 | Ainsworth et al. | |
| 5,559,646 A * | 9/1996 | Voorman et al. | 360/67 |
| 6,072,691 A | 6/2000 | Suharn et al. | |
| 6,081,095 A | 6/2000 | Tamura et al. | |
| 6,777,908 B2 * | 8/2004 | Thorne et al. | 320/103 |
| 6,940,771 B2 * | 9/2005 | Kant et al. | 365/203 |
| 7,342,768 B2 * | 3/2008 | Doljack et al. | 361/328 |
| 2003/0099123 A1 | 5/2003 | Odell | |
| 2004/0251934 A1 | 12/2004 | Yano et al. | 327/91 |

FOREIGN PATENT DOCUMENTS

| | | |
|---|---|---|
| EP | 1 107 438 A2 | 6/2001 |
| WO | WO 01/22554 A1 | 3/2001 |

OTHER PUBLICATIONS

British Search Report for corresponding British Application No. GB0705016.4, dated Dec. 12, 2007.
WO2004/073001 A1, Publication Date: Aug. 26, 2004; Title: "A Resistive Balance for an Energy Storage Device"; Applicant: Energy Storage Systems PTY LTD, Australia; Based on PCT/AU2004/000171, filed Feb. 13, 2004.
JP05299940A to Toshiba; Filing Date: Nov. 12, 1993; Applicant: Toshiba F.A. System ENG.; Tokyo Shibaura Electric Co.; Inventor: O. Chihiro.
JP2001186656 A; Filing Date: Jul. 6, 2001; Applicant: to Matsushita Electric IND CO LTD; Title: Voltage Balancer; Inventors: Y. Kaneharu et al.

* cited by examiner

*Primary Examiner*—Nguyen T Ha
(74) *Attorney, Agent, or Firm*—Armstrong Teasdale LLP

(57) ABSTRACT

Circuit modules, systems and devices for controlling voltages across capacitors.

46 Claims, 14 Drawing Sheets

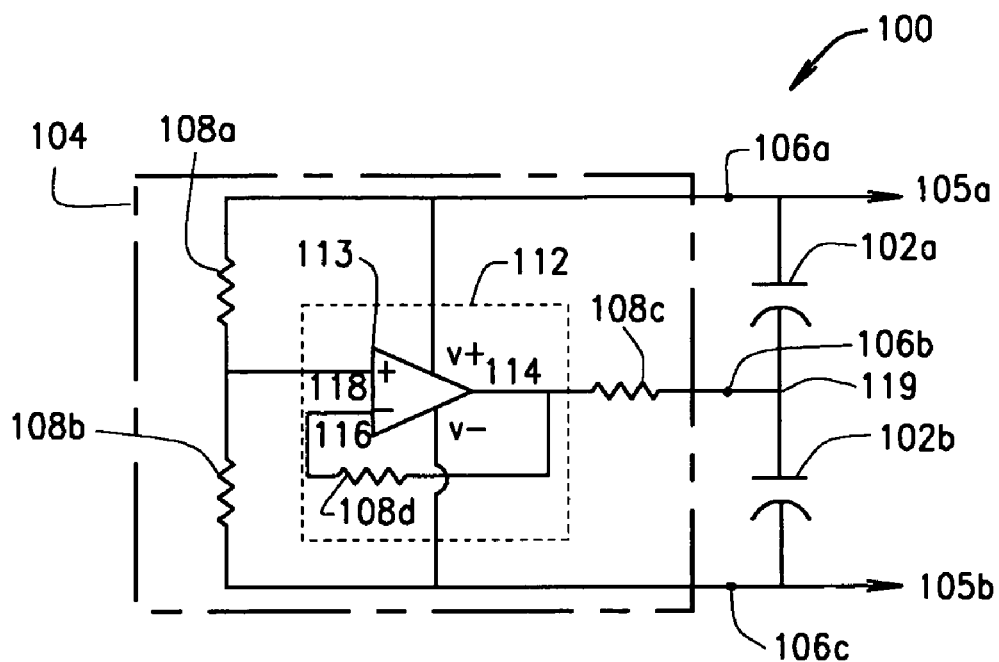
F I G . 1 A
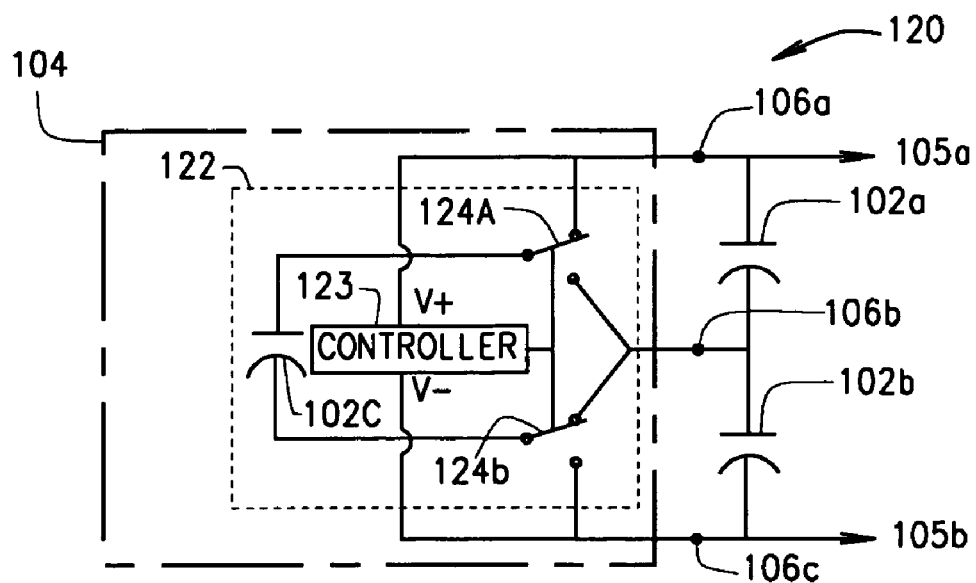
F I G . 1 B

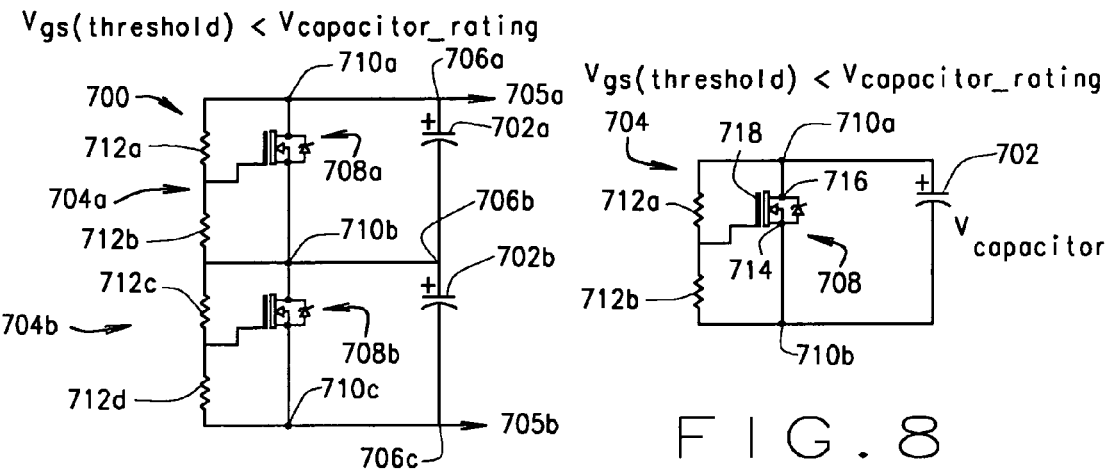
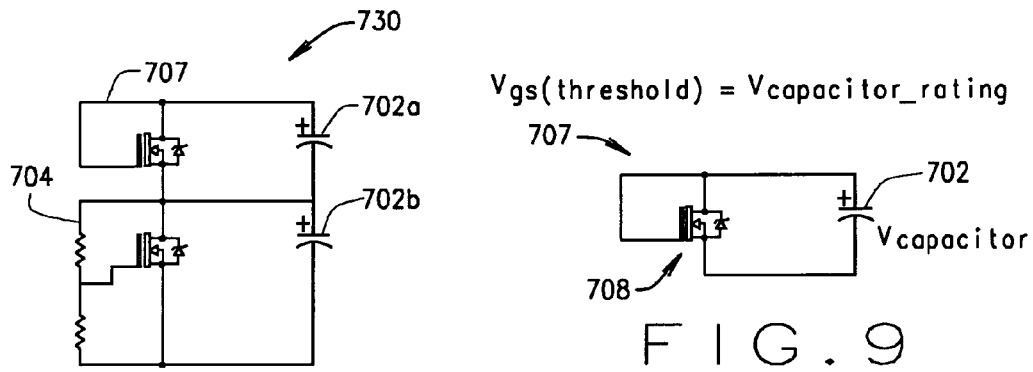
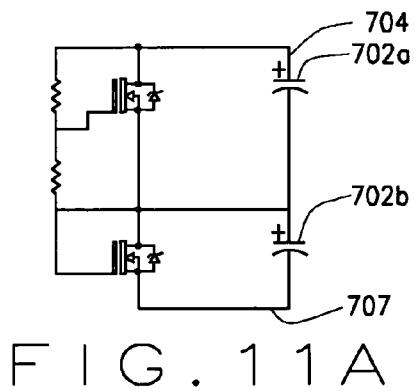
FIG. 7
FIG. 8
FIG. 9
FIG. 10
FIG. 11A
FIG. 11B

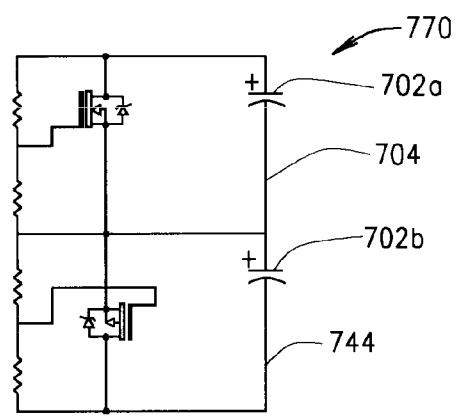
F I G . 17A
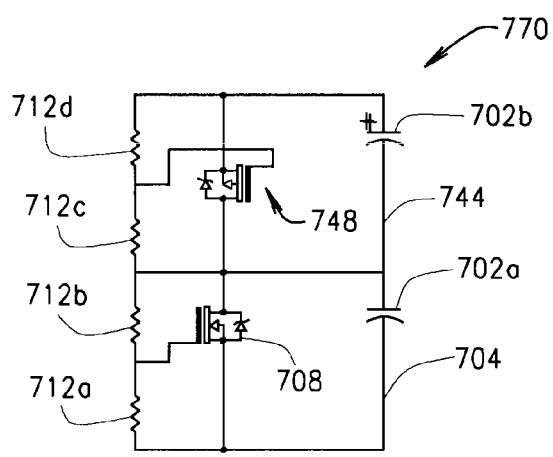
F I G . 17B
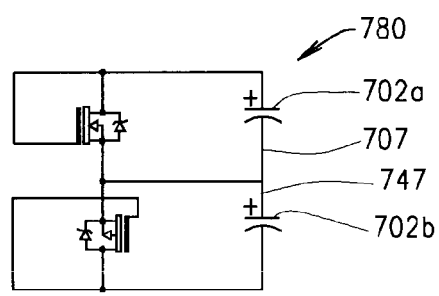
F I G . 18A
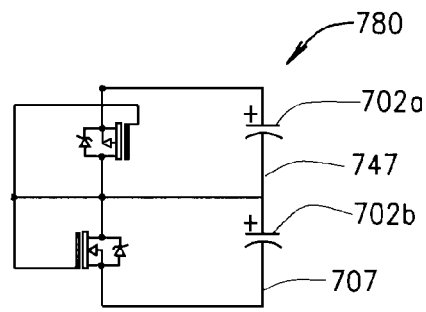
F I G . 18B

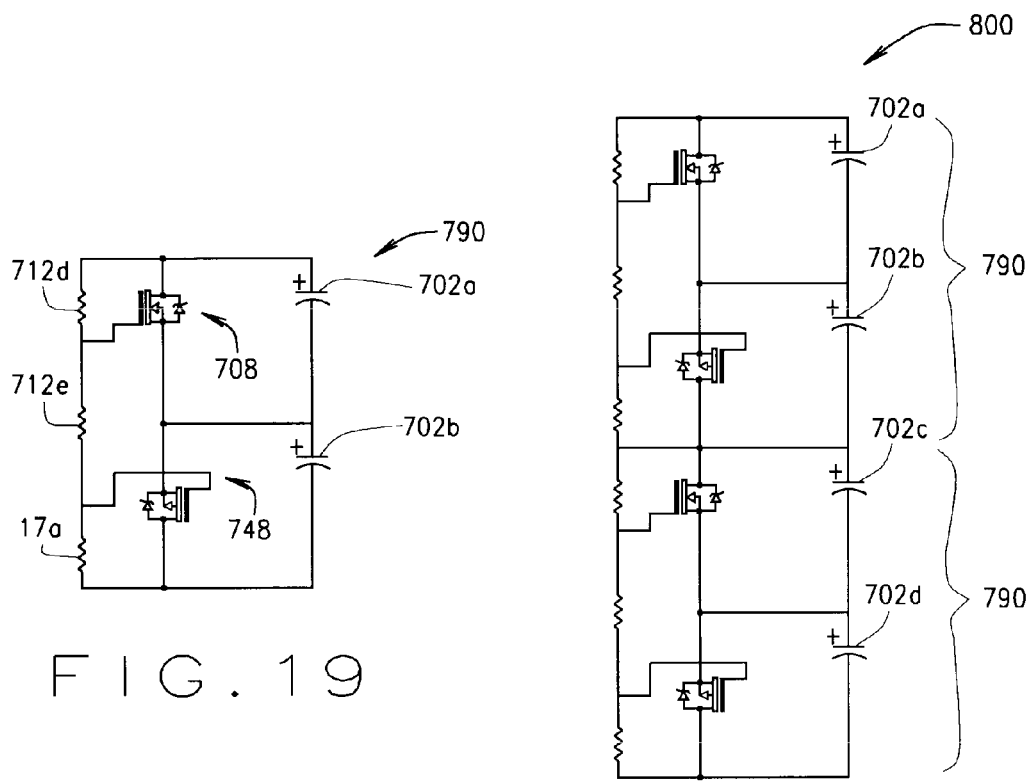
FIG. 19
FIG. 20
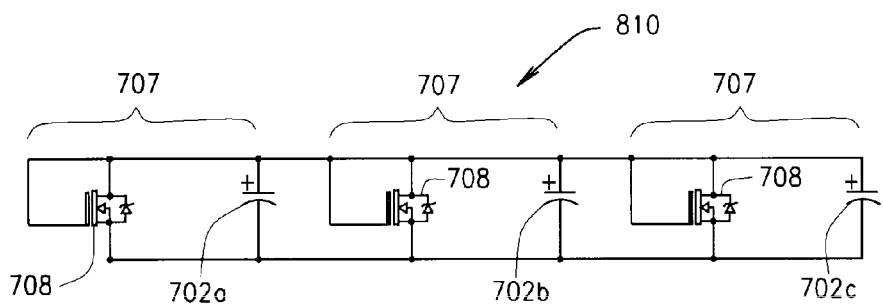
FIG. 21
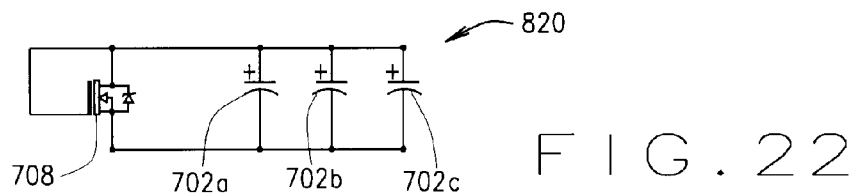
FIG. 22

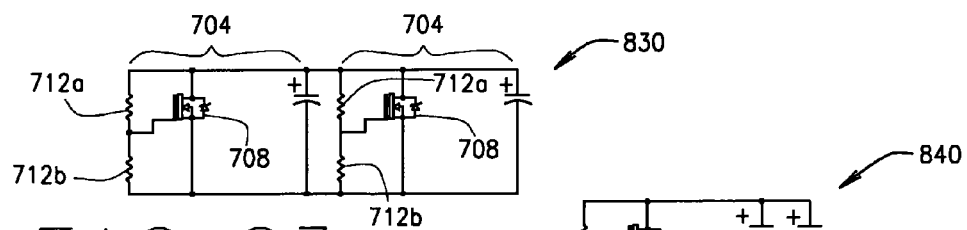
FIG.23
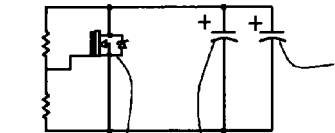
FIG.24
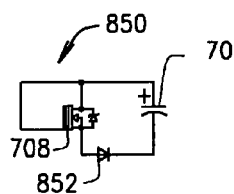
FIG.25A
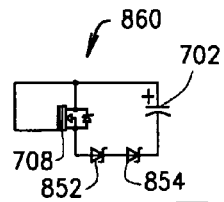
FIG.25B
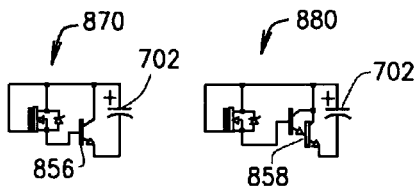
FIG.25C   FIG.25D
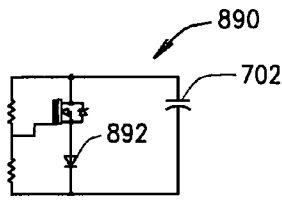
FIG.26A
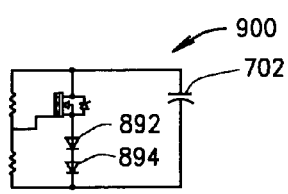
FIG.26B
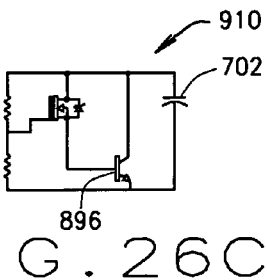
FIG.26C
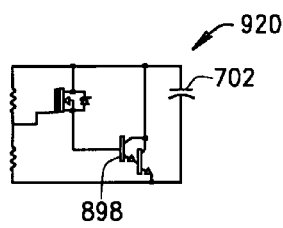
FIG.26D

ACTIVE BALANCING CIRCUIT MODULES, SYSTEMS AND CAPACITOR DEVICES

CROSS REFERENCE TO RELATED APPLICATIONS

This application is a continuation-in-part application of U.S. application Ser. No. 10/781,571 filed Feb. 17, 2004 now U.S. Pat. No. 7,342,768, and entitled Active Balancing Modular Circuits, the disclosure of which is hereby incorporated by reference in its entirety.

BACKGROUND OF THE INVENTION

This invention relates generally to The present invention relates to active balancing circuitry for capacitors and methods for their manufacture. More particularly, the invention relates to a module based active balancing circuitry for capacitors stacked in a series arrangement.

A capacitor is often designed with a maximum operating voltage rating where operation above this maximum operating voltage rating will generally lead to excessive leakage current, subsequent gas generation, and ultimately failure of the capacitor. In order to construct capacitances for higher voltage applications, capacitors of identical value and rating are stacked in a series arrangement. During charging as well as after charging of the capacitors, the total voltage divides equally across each capacitor in the stack so long as the capacitance values of each capacitor remain identical. Once charging is mostly complete and equilibrium conditions in the stack are reached, the voltage continues to divide equally across each capacitor as long as the leakage current of each capacitor is equal. In sum, unequal voltages across capacitors in such a series arrangement generally have two causes: 1) unequal capacitance values; 2) unequal equilibrium leakage current.

Several approaches have been conventionally implemented to attempt to control the voltage imbalances due to unequal capacitance values or to unequal equilibrium leakage current. In one approach, a technique known as passive balancing is used. Passive balancing involves using passive elements to equalize the voltages between the capacitors in the stack. Typically, this includes connecting equal valued resistors in parallel with the capacitors. Although passive balancing may work initially, passive balancing has a drawback of not being able to adjust for voltage imbalances due to changes in capacitance values or leakage currents over time.

In another approach, a technique known as active balancing is used. Active balancing involves using active elements to equalize the voltages between capacitors. Although this technique can be used to adjust for voltage imbalances over time, the conventional implementation of these active devices often is complicated and expensive.

Accordingly, there is a need to provide improved apparatus and corresponding methods that are easier and less expensive to implement and that can control voltage imbalances between capacitors stacked in a series arrangement, thereby, improving the capacitors life expectancy and electrical performance.

BRIEF DESCRIPTION OF THE DRAWINGS

FIG. 1A illustrates an active balancing system that includes a plurality of capacitors coupled to an active balancing module in accordance with various embodiments of the present invention.

FIG. 1B illustrates an active balancing system that includes a plurality of capacitors coupled to an active balancing module in accordance with various embodiments of the present invention.

FIG. 7 illustrates another embodiment of an active balancing system that includes a plurality of capacitors coupled to multiple active balancing modules in accordance with various embodiments of the present invention.

FIG. 8 illustrates an active balancing module for the system shown in FIG. 7.

FIG. 9 illustrates another active balancing module for the system shown in FIG. 7.

FIG. 10 illustrates an active balancing system having modules shown in FIG. 9.

FIGS. 11A and 11B illustrate an active balancing system having combinations of the modules shown in FIGS. 8 and 9.

FIGS. 17A and 17B illustrate an active balancing system having a combination of the modules shown in FIGS. 8 and 13.

FIGS. 18A and 18B illustrate an active balancing system having a combination of the modules shown in FIGS. 9 and 14.

FIG. 19 illustrates another embodiment of an active balancing module.

FIG. 20 illustrates an active balancing system having the modules of FIG. 19.

FIG. 21 illustrates a capacitor protection system having the modules of FIGS. 8 and 9 connected in parallel.

FIG. 22 illustrates an alternative system to the capacitor protection system shown in FIG. 21.

FIG. 23 illustrates a capacitor protection system having the modules of FIG. 8 connected in parallel.

FIG. 24 illustrates an alternative system to the capacitor protection system shown in FIG. 23.

FIGS. 25A, 25B, 25C, 25D illustrate protection circuits with auxiliary devices.

FIGS. 26A, 26B, 26C, 26D illustrate other protection circuits with auxiliary devices.

DETAILED DESCRIPTION OF THE INVENTION

Figure 2:
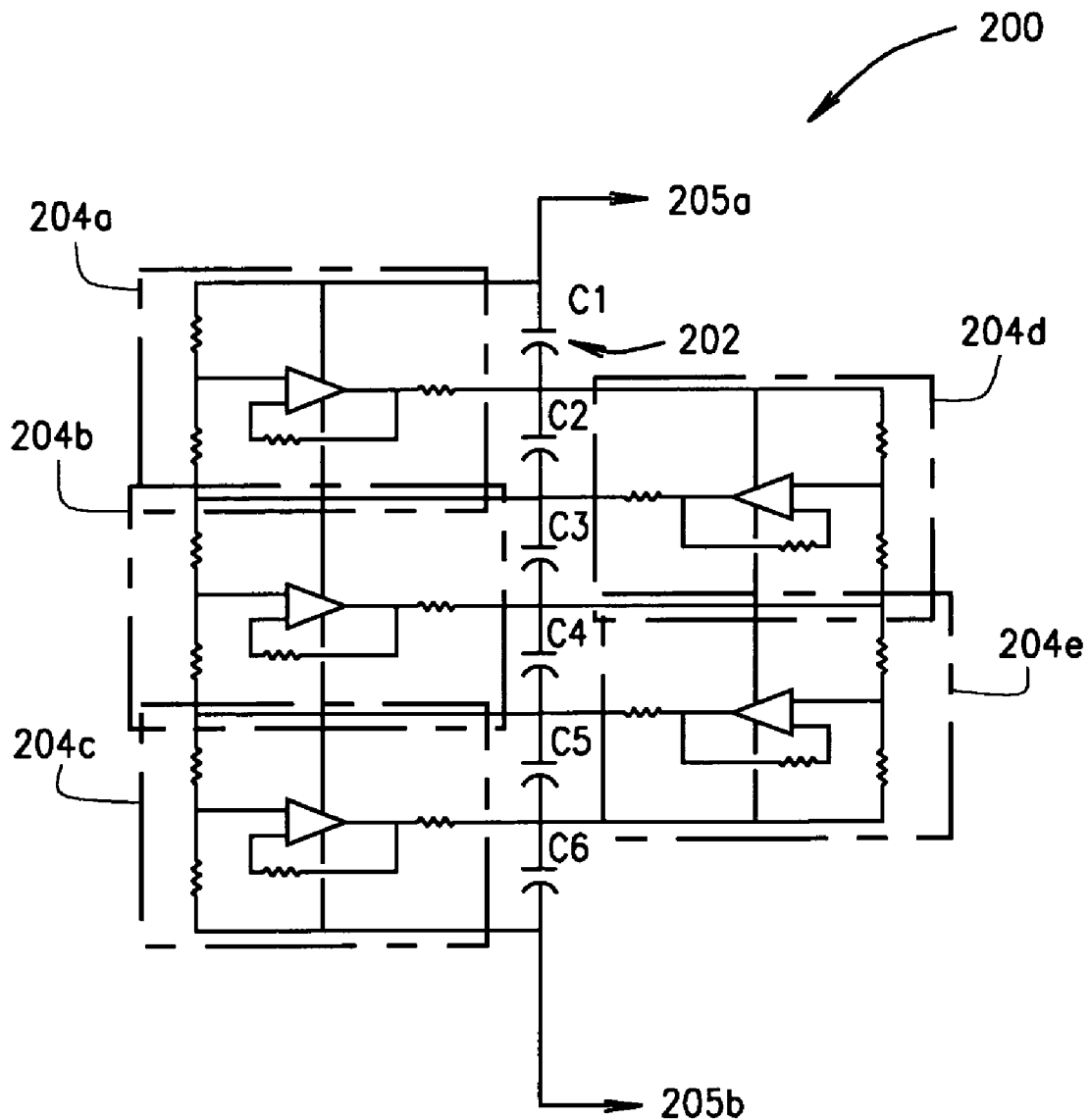
FIG. 2 illustrates an active balancing system that includes a plurality of capacitors coupled to multiple active balancing modules in accordance with various embodiments of the present invention.

Reference will now be made in detail to preferred embodiments of the invention. Examples of the preferred embodiments are illustrated in the accompanying drawings. While the invention will be described in conjunction with these preferred embodiments, it will be understood that it is not intended to limit the invention to such preferred embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The present invention provides active balancing modules that contain active balancing circuitry to control voltage imbalances between capacitors stacked in a series arrangement and methods for their manufacture. These modules are simple and inexpensive to manufacture, and versatile. They may be used alone or they may be combined together to form a multi-module active balancing circuitry for a plurality of capacitors stacked in a series arrangement. The modules may further be aligned in either a side-by-side topology or an overlapping topology.

I. Introduction.

As mentioned earlier, unequal voltages across capacitors in a series arrangement generally have two causes: 1) unequal capacitance values; 2) unequal equilibrium leakage current. Unequal capacitance values may result from manufacturing variations or aging due to the use of the capacitors over time. Unequal capacitance values can cause lower capacitance valued capacitors to operate beyond their maximum operating voltages that in turn may contribute to excessive leakage currents.

However, even when the capacitance values are well matched, leakage current mismatch can still cause overvoltages to occur on capacitors in the stack during equilibrium in the substantially charged state. A capacitor with a leakage current much greater than the average of its neighbors may charge its neighbors to beyond their maximum operating voltage, resulting in eventual failure of the affected capacitors. This is because, in an equilibrium state, leakage currents have a tendency to balance themselves. Therefore, the low leakage capacitors will accumulate charge in raising their voltages. Subsequently, the leakage currents of the affected capacitors increase and eventually balance with the leakage current of the discrepant capacitor.

Although a variety of capacitors may exhibit voltage imbalances, capacitors that tend to be more affected are electrolytic technology capacitors. This is because electrolytic technology capacitors usually have associated with them large leakage currents. Furthermore, electrolytic technology capacitors usually have large values of capacitance where they are popularly called supercapacitors or ultracapacitors.

II. Active Balancing Module

In order to control voltage imbalances between capacitors stacked in a series arrangement, an active balancing module is provided in the present invention. A purpose of the active balancing module is to maintain equal voltage across each capacitor in the series stack of capacitors when the capacitor stack is substantially fully charged, which occurs at an equilibrium state where relatively no charging or discharging is being performed on the series stack of capacitors from a connected power source or load. As will be discussed below, the active balancing module is applicable to any series stack of capacitors having two or more capacitors.

To begin, FIGS. 1A and 1B illustrate respectively active balancing systems 100 and 120 that include a plurality of capacitors 102 (e.g., 102a, 102b) coupled to an active balancing module 104 in accordance with various embodiments of the present invention. The coupling between the plurality of capacitors 102 and active balancing module 104 is done at three terminals 106 (e.g., 106a, 106b, 106c). Terminal 106a connects to a positive plate of capacitor 102a. Terminal 106b connects to a negative plate of capacitor 102a as well as to a positive plate of capacitor 102b. Terminal 106c connects to a negative plate of capacitor 102b. As shown, capacitors 102a and 102b are connected/stacked in a series arrangement where a voltage is applied through connections 105a and 105b. Connection 105a and 105b may be connected to a power source and/or a load for powering.

In general, active balancing module 104 includes an active element. In one embodiment, as illustrated in FIG. 1A, the active element is an op amp device 112. Op amp device 112 includes an op amp 113 that is adapted as a voltage follower. That is, an op amp circuit that uses voltage feedback where the circuit has high input impedance, low output impedance, and voltage gain of 1. As such, if the output 144 of op-amp 113 is connected to its inverting (−) input 116, the output voltage will seek whatever level is necessary to balance the inverting input's voltage with that applied to the non-inverting (+) input 118. If this feedback connection is direct, as in a straight piece of wire, the output voltage will substantially "follow" the non-inverting input's voltage.

In order to substantially balance the voltages of the capacitors, the input of op amp 113 is connected to a pair of voltage dividing resistors 108a and 108b where each resistor is in parallel with a corresponding capacitor (e.g., 102a, 102b). Voltage dividing resistors 108a and 108b are equal in resistance value. The value of resistance is chosen through an optimization algorithm which attempts to prevent any overvoltage in the stack given the worst case leakage value and simultaneously tries to minimize the additional leakage current that the voltage dividing resistors may introduce.

Op amp 113 and voltage dividing resistors 108a and 108b operate on the interstitial node 119 of the pair of capacitors 102a and 102b. Current is sourced or sunk from this node in order to force the voltage sharing across each capacitor to divide according to the division defined by the two voltage dividing resistors 108a and 108b. Current is sourced or sunk by drawing charge as appropriate from either the top (positive) plate of capacitor 102a or the bottom (negative) plate of capacitor 102b since the op amp's power connections V+ and V− are referenced to these points respectively.

Optionally, a current limiting resistor 108c may be applied to the output of the op amp as shown in FIG. 1A. However, the active element may already include current limiting short circuit protection. For example, op amp 113 may be integrated with current limiting short circuit protection. Another optional resistor is the feedback resistor 108d. Feedback resistor 108d may be used to balance the input offset current at the inputs. In general, the value of feedback resistor 108d is chosen as the parallel combination of voltage dividing resistors 108a and 108b.

Although a voltage follower by definition has a voltage gain of 1, its purpose has nothing to do with amplifying voltage, but rather with amplifying a signal's capacity to deliver current to a load (e.g., 102a, 102b). As such, the op amp implementation of active balancing module 104 sources and sinks large values of current to or from the capacitors during the discharge/recharge period of peak power demands. In addition, charge equalization against mismatched leakage currents during the periods of stable and equilibrium state of full charge can be realized. Thus, both causes of voltage imbalances, capacitance variation and mismatched leakage currents, can be effectively controlled.

Another embodiment of the active element in active balancing module 104 is illustrated in FIG. 1B. As shown, the active element is a flying capacitor device 122. Generally, flying capacitor device 122 utilizes a controller 123 to control the synchronous switching of switches 124a and 124b so that connection to a flying capacitor 102c can be oscillated between a plurality of capacitors 102 (e.g., 102a and 102b). Specifically, switches 124a and 124b must operate as break before make and be synchronous with each other. That is, both must first break before they can make. One switch cannot lead the other and make while the lagging one has not yet broken its contact. The connection between flying capacitor 102 and the plurality of capacitors will allow charge to either sink/source there between. Over time, the balancing of voltages between the plurality of capacitors can be achieved.

It is important to note that no inductive elements (i.e., inductors), which are relatively expensive, are used in active balancing module 104. Moreover, the powering of the active elements (e.g., 112, 122) in active balancing module 104 can be done through the quiescent current present in the system and/or referenced to a pair of capacitors (e.g., by connecting V+ of op amp 113/controller 123 to the positive plate of capacitor 102a; by connecting V− of op amp 113/controller 123 to the negative plate of capacitor 102b). In effect, each active balancing module 104 can be self-contained or work in combination with another as illustrated next in FIG. 2 below.

Active balancing modules may be used alone or they may be combined together to form a multi-module active balancing circuitry for a plurality of capacitors stacked in a series arrangement. For instance, FIG. 2 illustrates an active balancing system 200 that includes a plurality of capacitors 202 (e.g., C1-C6) coupled to multiple active balancing modules 204 (e.g., 204a-e) in accordance with various embodiments of the present invention. The capacitors may be connected to a power source and/or a load through connections 205a and 205b. Active balancing modules 204 can be any module based active balancing circuitry (e.g., 104) for capacitors stacked in a series arrangement. For a given pair of capacitors, active balancing module 204 is typically defined as a three terminal device which attaches to the top plate of the top capacitor, the interstitial node, and the bottom plate of the bottom capacitor. Multiple active balancing modules 204 may be aligned in a side-by-side topology and/or aligned in an overlapping topology as shown in FIG. 2.

Synchronization between multiple modules may be provided. However, both op amp devices and flying capacitor devices generally makes synchronization optional. This is because each op amp device operates at a different interstitial node whereas each flying capacitor device allows the flying capacitor to sequentially connect in parallel to any number of capacitors for voltage equalization.

In general, one active balancing module 204 is required for a pair of capacitors. However, in an overlapping topology, two active balancing modules 204 are required for three capacitors, three active balancing modules 204 are required for four capacitors, and so on. In one embodiment, the overlapping topology involves having each capacitor between the top most capacitor and the bottom most capacitor operated upon by two active balancing modules 204.

A benefit of the overlapping topology forces the complete stack of capacitors to share voltage equally. Furthermore, a transitive relationship can be realized between the capacitors in the stack. For instance, consider having two modules overlapping and three capacitors A, B, and C stacked in a series arrangement. One module may force the voltage of A to equal the voltage of B. The other module may force the voltage of B to equal the voltage of C. As a result, the voltage of A will equal the voltage of C.

EXAMPLE

To further understand the benefits of the present invention, the following example provides details concerning an active balancing system with active balancing modules in accordance with one embodiment of the present invention. It should be understood the following is representative only, and that the invention is not limited by the detail set forth in this example.

Figure 3:
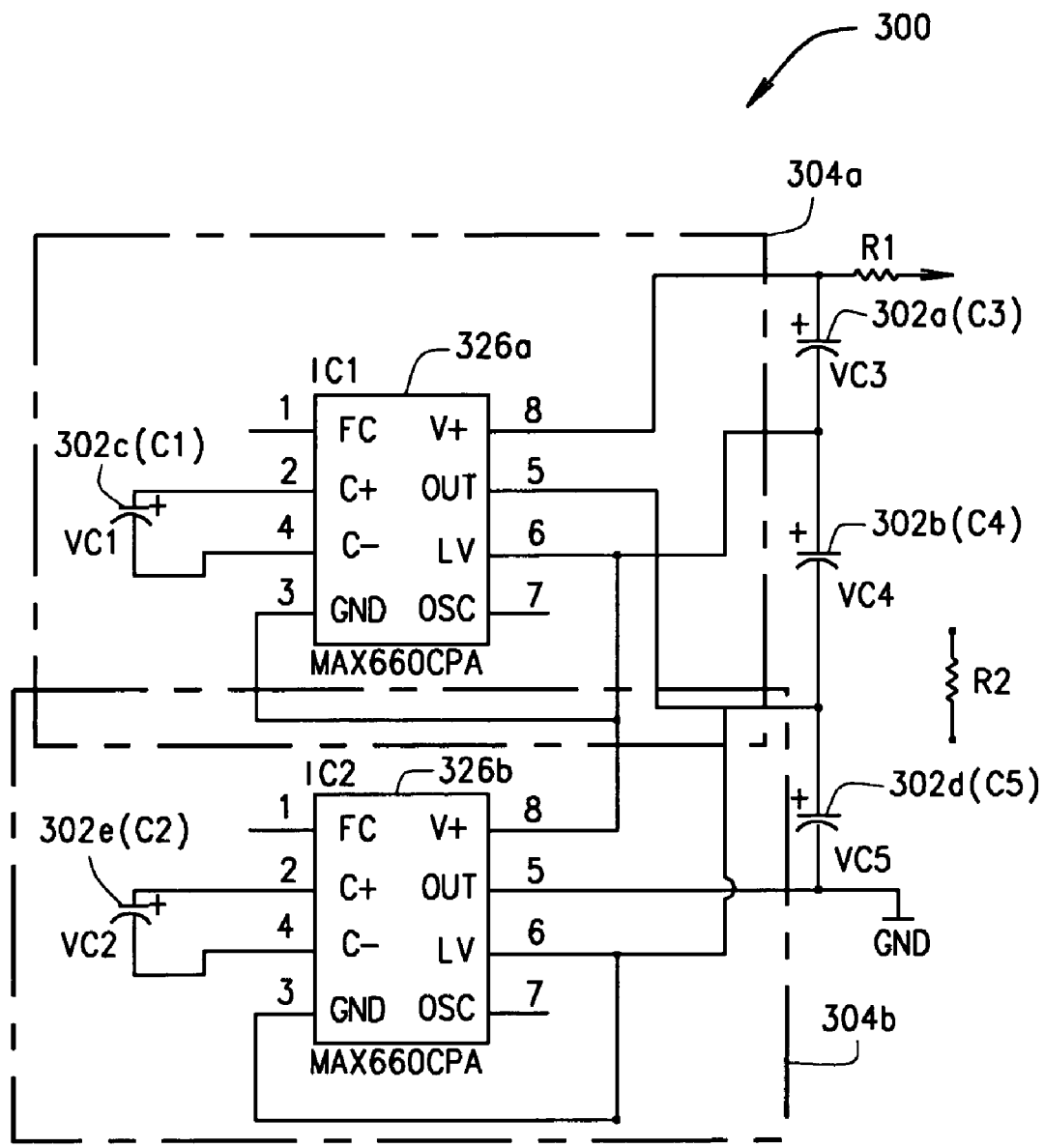
FIG. 3 illustrates an active balancing system that includes a plurality of capacitors coupled to multiple active balancing modules in accordance with various embodiments of the present invention.

FIG. 3 illustrates an active balancing system 300 that includes a plurality of capacitors 302 (e.g., 302a, 302b, 302d) coupled to multiple active balancing modules 304 (e.g., 304a, 304b). FIG. 3 illustrates the concept introduced by system 120 and system 200. As shown, active balancing modules 304a and 304b implement flying capacitor devices. With respect to active balancing module 304a, the flying capacitor device includes a switched voltage converter 326a in connection with a flying capacitor 302c. On the other hand, the flying capacitor device for active balancing module 304b includes a switched voltage converter 326b in connection with a flying capacitor 302e.

Theoretically speaking, switched voltage converter 326a will generally force the pair of capacitors 302a and 302b to charge to equal voltages. In achieving this, flying capacitor 302c transfers charge between capacitors 302a and 302b until their voltages are equal. Switched voltage converter 326b and its corresponding flying capacitor 302e perform the same function on the pair of capacitors 302b and 302d. It follows that the voltage across each capacitor will equilibrate at V.sup.+/3.

For experimental purposes, switched voltage converters IC1 (i.e., 326a) and IC2 (i.e., 326b) are MAX660 available from Maxim Integrated Products of Sunnyvale, Calif. Flying capacitors C1 (i.e., 302c) and C2 (i.e., 302e) are 10 microfarad tantalum capacitors with working voltage ratings of 25 VDC. V.sup.+ is 7.8 VDC applied through a current limiting and current measuring resistor R1. The capacitors C3, C4, and C5 are 22 Farad B Series capacitors rated at 2.5 VDC. A resistor R2 is 220 ohms and was applied across one of the capacitors in the stack to simulate a badly leaking capacitor.

In the experiment, VC1+, VC1−, VC2+, and VC2− were measured to assure that the switched voltage converters IC1 and IC2 were operating properly. VC3, VC4, VC5, and IR1 (current in R1) were also measured. The voltages were then monitored over time to determine how well the design achieved voltage balance.

The test capacitors C3, C4, C5 were measured for actual capacitance value with a constant current of 1 Ampere. The time elapsed during charging/discharging between 0.5. volts and 2.0 volts was used to calculate capacitance. The capacitance values are tabulated in the following table.

|  | Farads | | |
| --- | --- | --- | --- |
|  | C3 | C4 | C5 |
| Charging | 17.6 | 17.6 | 18.5 |
| Discharging | 18.2 | 18.0 | 18.6 |
| Average Value | 17.9 | 17.8 | 18.6 |

IC1 and IC2 were found to reliably start up its internal oscillator when the voltage from pin 8 to pin 3 was 2 to 2.5 volts. The oscillator sometimes did not start unless pin 6 was connected as shown.

The first experiment involved charging the stack, observing the balance, applying R2 across C3, observing the imbalance which equilibrates, removing R2, and finally observing the restoration of balance. The second experiment involved placing R2 across C4, observing the imbalance, removing R2, and observing the recovery.

The following table shows the results. The times are the approximate intervals which elapsed between when each change was made and when values were measured.

| | Time | | | | | | |
| --- | --- | --- | --- | --- | --- | --- | --- |
| | 10 min | 1 hour | 1 hour | 1 hour | 18 hours | 1 hour | 5 min. |
| VC3 | 2.63 V | 2.61 V | 2.53 V | 2.61 V | 2.61 V | 2.61 V | 2.60 V |
| VC4 | 2.59 V | 2.61 V | 2.601 V | 2.60 V | 2.60 V | 2.57 V | 2.61 V |
| VC5 | 2.54 V | 2.59 V | 2.638 V | 2.60 V | 2.60 V | 2.60 V | 2.60 V |
| Total V | 7.76 V | 7.81 V | 7.77 V | 7.81 V | 7.81 V | 7.78 V | 7.81 V |
| IR1 | — | — | 4.67 mA | .45 mA | .13 mA | 4.08 mA | .12 mA |

Inspection of the results shows that the design drives the balance to within about 0.02 volts. R2 represents a serious leakage path, in excess of 10 mA. The worst out-of-balance this caused was only 0.07 volts lower voltage across the "leaker". In the second case, the voltage was lower by only 0.03 volts. However, the overall leakage was under 5 mA in both cases. Apparently, the flying capacitor operation was returning the leakage charge back to the opposite plate of the "leaker". In this way, the flying capacitor technique is more efficient than shunt elements or source/sink voltage followers used for active balancing.

III. Packaging of Active Balancing Module

Figure 4A:
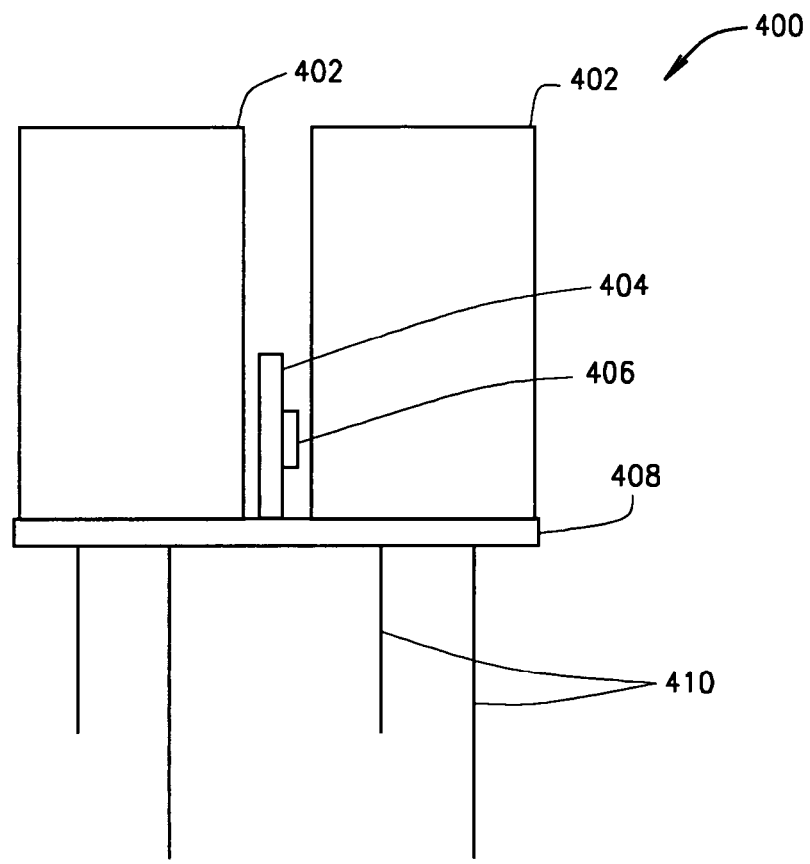
FIG. 4A illustrates a side plan view of a capacitor device package in accordance with a first embodiment of the present invention.
Figure 4B:
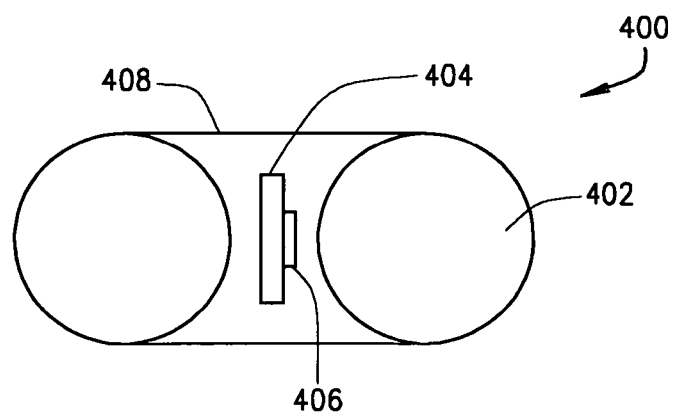
FIG. 4B illustrates a top plan view of the capacitor device package in FIG. 4A.

Based on the modularity of the active balancing module, a variety of capacitor device packages may be achieved. These packages illustrate the versatility of the active balancing modules of the present invention. For example, FIG. 4A illustrates a side plan view of a capacitor device package 400 in accordance with a first embodiment of the present invention. On the other hand, FIG. 4B illustrates a top plan view of capacitor device package 400.

As shown, capacitor device package 400 includes a pair of capacitors 402 mounted along with a daughter board 404 on top of a motherboard 408. Capacitor 402 may be packaged in any conventional way that will be acceptable to the particular application. For instance, capacitors 402 may be wound (coiled) type capacitors within protective plastic canisters. An active balancing circuitry 406 is included on daughter board 404. Both daughter board 404 and motherboard 408 provide connectivity between active balancing circuitry 406, capacitors 402, and external leads 410 (e.g., 105a, 105b, 205a, 205b), which are attached to the bottom of motherboard 410. External leads 410 are usually made of an electrical conductive material such as copper and may be plated for durability.

In general, each daughter board 404 will contain just one active balancing circuit 406. The daughter board together with the active balancing module will often be located proximate to (e.g., between) the corresponding pair of capacitors 402 that the active balancing module actively balances. Any active balancing circuitry 406 may be used to form the capacitor device package 400. Typically, active balancing circuitry 406 contains circuitry that may be similar to active balancing modules 104, 204, or 304. As such, daughter board 404 may act as an active balancing module in accordance with the present invention.

Capacitor device package 400 may be expandable to any number of capacitors 402 stacked in a series arrangement. To doing so, motherboard 408 and external leads 410 may be expanded to accommodate any number of capacitors 402. For example, for a three-capacitor series configuration, two corresponding daughter boards 404 having overlapping active balancing circuitry 406 can be positioned there between. That is, each capacitor 402 will be separated from an adjacent capacitor by a daughter board 404. In general, each daughter board 404 (active balancing module) will be identical in construction and functionality. Due to the modularity of active balancing modules, a daughter board (active balancing module) can easily be added accordingly with any number of additional series connected capacitors.

Figure 5A:
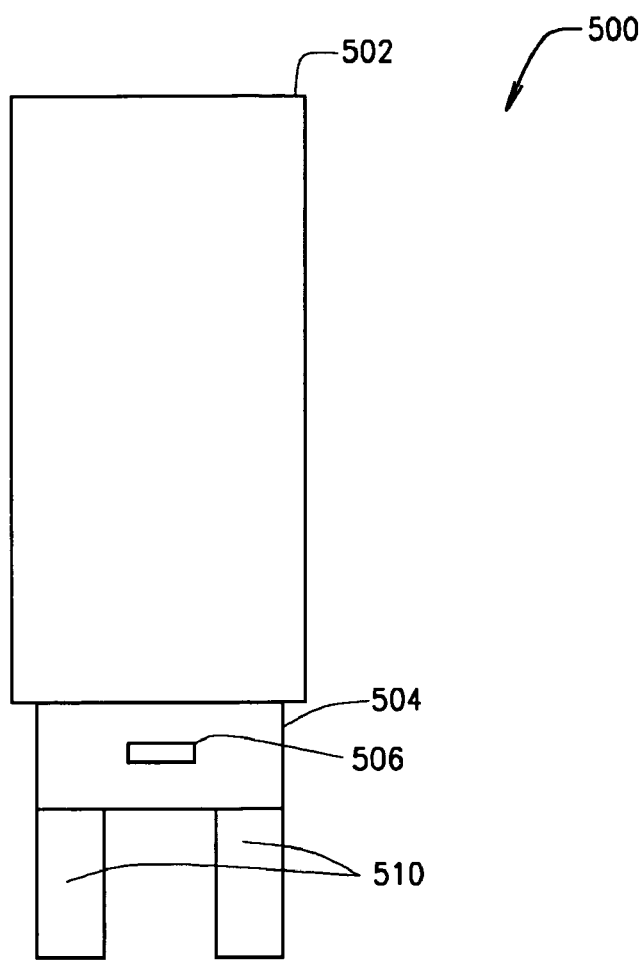
FIG. 5A illustrates a side plan view of a capacitor device package in accordance with a second embodiment of the present invention.
Figure 5B:
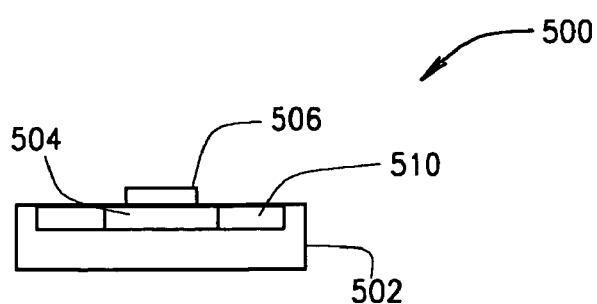
FIG. 5B illustrates a bottom plan view of the capacitor device package in FIG. 5A.

Other alternative capacitor device packages may be adapted for implementing the present invention. For example, FIG. 5A illustrates a side plan view of a capacitor device package 500 in accordance with a second embodiment of the present invention where FIG. 5B illustrates a corresponding bottom plan view of capacitor device package 500.

Capacitor device package 500 implements a flex circuit construction and includes a capacitor 502. Capacitor 502 generally is used when a thin/low profile capacitor device package is sought. Capacitor 502 is typically a folded type capacitor where capacitor sheets are folded within a flexible protective shell. However, multiple capacitors may be integrated within Capacitor 502. For example, Capacitor 502 may include a plurality of capacitors stacked in a series arrangement.

Capacitor 502 is connected to external leads 510. In this embodiment, capacitor 502 and external leads 510 are substantially flat, rectangular, and flexible in form. External leads 510 provide electrical connection to capacitor device package 500 and may be formed use any electrical conducting material.

Mounted across the external leads 510 and in connection therewith, an active balancing module 504 having active balancing circuitry 506 is formed. Typically, active balancing circuitry 504 contains circuitry that may be similar to active balancing modules 104, 204, or 304. Any material may be used to construct active balancing module 504. Preferably, the material used will be consistent with the design application. For instance, a flexible material that is easily adaptable to external leads 510 can be used. In general, active balancing module 504 will provide connections between active balancing circuitry 506 and capacitor 502.

Figure 6A:
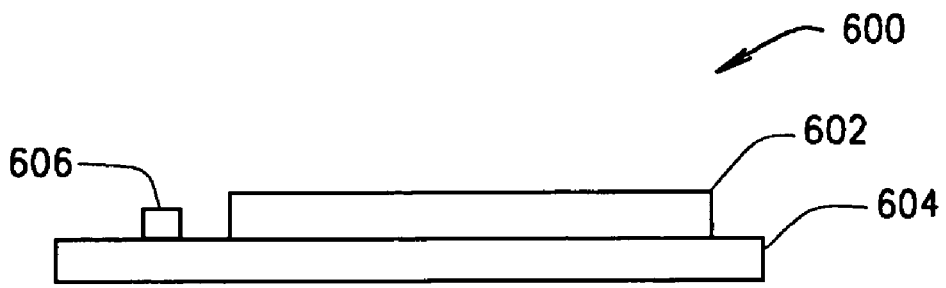
FIG. 6A illustrates a side plan view of a capacitor device package in accordance with a third embodiment of the present invention.
Figure 6B:
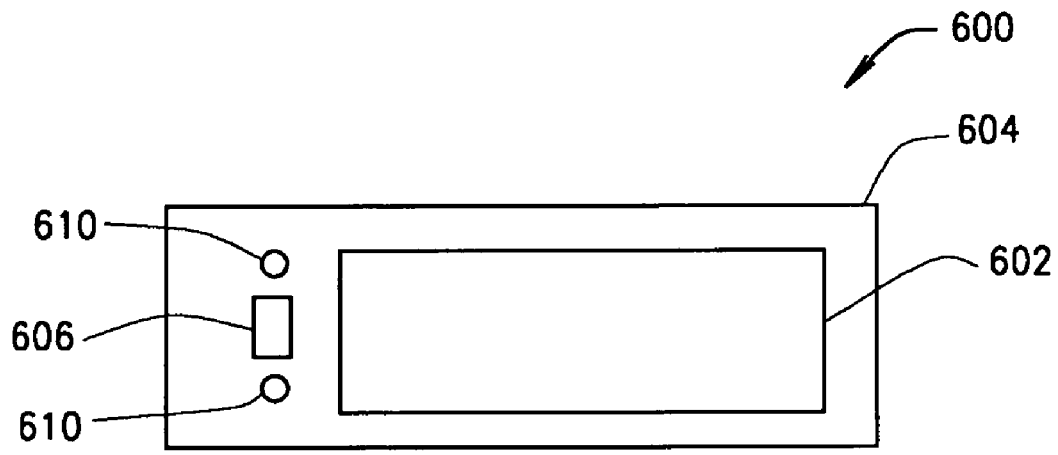
FIG. 6B illustrates a top plan view of the capacitor device package in FIG. 6A.

Finally, FIG. 6A illustrates a side plan view of a capacitor device package 600 in accordance with a third embodiment of the present invention where FIG. 6B illustrates a top plan view of capacitor device package 600.

As shown, a capacitor 602 is mounted together with an active balancing module 606 on a top surface of a substrate 604 (e.g., motherboard). Substrate 604 is generally composed of a non-conductive material, for example, of ceramic, plastic, or another suitable material as are well known to those skilled in the art. Substrate 604 includes a pair of vias 610 for connection to pads located on its opposing surface. Substrate 604 includes electrical traces (not shown) for connecting capacitor 602, active balancing module 606, and vias 610 together in accordance with the present invention. As such, capacitor device package 600 can be easily mounted into any electronic device (e.g., cell phone).

Figure 6C:
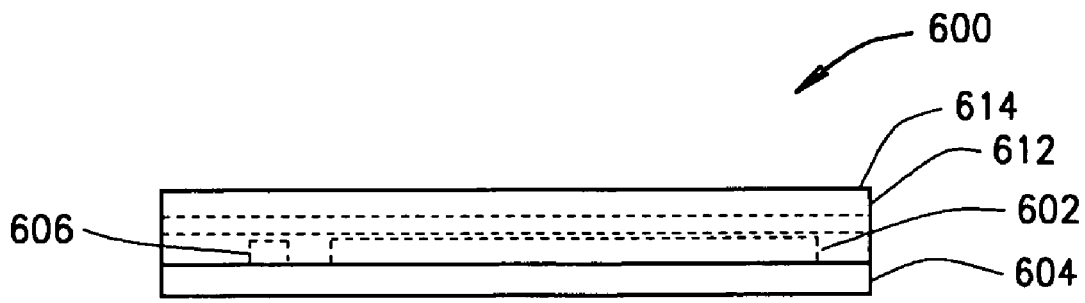
FIG. 6C illustrates a side plan view of the capacitor device package in FIG. 6A encapsulated in molding material.

Alternatively, capacitor device package 600 may be further encapsulated for more protection. For example, FIG. 6C illustrates a side plan view of capacitor device package 600 encapsulated in molding material. Any conventional molding material (e.g., plastic) may be used. Prior to encapsulation to form a lid 614, a substrate 612 may be added to cover capacitor device package 600. If at all, substrate 612 may extend over and cover above any portion of module 606, capacitor 602, and/or substrate 604. Likewise, if at all, molding material may encapsulate any portion of module 606, capacitor 602, and/or substrate 604. As with substrate 604, substrate 612 is also generally composed of a non-conductive material, for example, of ceramic, plastic, or another suitable material as is well known to those skilled in the art. The purpose of substrate 612 is to provide structural stability to the encapsulated capacitor device package 600.

Packages 400, 500, and 600 are useful for power back-up applications and are easily and inexpensively constructed using as components the active balancing modules of the present invention. Many of the components for implementing the present invention are also readily available off-the-shelf low cost components.

The present invention presents many advantages over conventional methods, especially in the area of supercapacitors. Since supercapacitors typically have a maximum operating voltage in the range of 2.3 volts to 2.7 volts, low quiescent current active elements (e.g., op amp device 112) may be used in minimizing the leakage current drain in the active balancing system. The active balancing modules may also be scalable based on the application. For example, selecting an active element based on the anticipated current flow of the system. Furthermore, the simplicity of a three terminal module and a low component count allows for fewer connections and easier packaging integration with a plurality of capacitors in a series arrangement.

Another advantage of the present invention is that the active elements (e.g., op amp device 112, flying capacitor device 122) will unlikely and perhaps never see V+ and V− substantially exceeding the combined rated voltage of their corresponding capacitors, which in some cases total 5 volts (2.5 volts for each capacitor of a corresponding capacitor pair). This is due to how the active element power connections are referenced (e.g., between two capacitors; 106a and 106c). As such, the rating of the active elements may all be individually selected based on the combined rated voltage of their corresponding capacitors. Therefore, for large stacks where the voltage between the very top and very bottom capacitors becomes large, low cost and low voltage active elements can continue to be implemented there between.

Yet, another advantage of the present invention is the ability to substantially balance the leakage current during the equilibrium state (e.g., during standby). This is important since capacitors spend most of their time in standby waiting to supply a load. As such, any leakage current mismatches during this time will cause overvoltage conditions to exist as well. Therefore, persistent leakage current mismatches during the equilibrium state can significantly reduce the life of the capacitors.

IV. Active Element Protection Modules and Systems

According to another aspect of the invention, capacitor protection modules are provided that, unlike the aforementioned balancing modules described above, are equally applicable to protect a series stack of capacitors having two or more capacitors, two or more capacitors connected in parallel, or even single capacitors, from voltages that exceed a predetermined threshold. Such protection modules may achieve a balancing effect for capacitors of approximately equal voltage ratings as explained below. Exemplary embodiments of the invention are believed to be particularly advantageous for DC circuit topologies that use circuit elements to move charge in a quasi-static manner, as opposed to AC topologies wherein charge is taken from a source or shuttled from a capacitor to others using efficient AC techniques such as those found in switch mode converters.

FIG. 7 illustrates an exemplary embodiment of an active balancing system 700 for a plurality of capacitors 702 (e.g., capacitors 702a and 702b) each corresponding to an exemplary protection module 704a, 704b, respectively. Coupling between the capacitors 702 is done at three terminals 706 (e.g., 706a, 706b, 706c). Terminal 706a connects to a positive plate of capacitor 702a. Terminal 706b connects to a negative plate of capacitor 702a as well as to a positive plate of capacitor 702b. Terminal 706c connects to a negative plate of capacitor 702b. As shown, capacitors 702a and 702b are connected/stacked in a series arrangement wherein a voltage is applied through connections 705a and 705b. Connection 705a and 705b may be connected to a power source and/or a load for powering.

Each protection module 704a, 704b includes a respective active element 708 (e.g., elements 708a, 708b) described below. The active elements 708 are connected at terminals 710 (e.g., terminals 710a, 710b, 710c). Resistors 712 (e.g., resistors 712a, 712b, 712c, 712d) are provided and connected to the active elements 708 as explained below and determine the behavior of the active elements 708 to maintain a voltage across each capacitor 702 at or below a predetermined threshold.

FIG. 8 illustrates one of the active balancing modules 704 for the system 700 shown in FIG. 7. In an exemplary embodiment the active element 708 is a known n-type Metal-Oxide-Semiconductor Field Effect Transistor (MOSFET) element having a source 714, a drain 716, and a gate 718. The gate 718 is connected to the terminal 710a and the terminal 710b so that the voltage across the capacitor 702 is also placed across the gate 718 of the MOSFET element 708. The flow of electrons between the source 714 and the drain 718 is controlled by the voltage applied to the gate 718.

In an illustrative embodiment, the MOSFET element 708 is Enhancement mode MOSFET and possesses a positive gate-to-source threshold value, $V_{gs\ (threshold)}$. When a positive value of gate-to-source voltage ($V_{gs}$) rises to and exceeds this value, the drain-to-source current rises rapidly if a positive value of drain-to-source voltage is simultaneously present. The rate of current rise per unit change in gate voltage is called the forward transconductance of the device, gfs. As those in the art will appreciate, the forward transconductance value may range from small values (about 0.1 for example) to large values (about 100 for example), depending upon the construction of the MOSFET element 708. Therefore, for small changes in gate voltage, large changes in drain-source current are possible.

In an exemplary embodiment, the capacitor 702 is designed to function in the circuit at or below a certain voltage threshold corresponding to the rated voltage of the capacitor being protected, referred to herein as $V_{capacitor\_rating}$ (e.g., about 2.3 to 2.7 volts for an exemplary capacitor). At voltages above $V_{capacitor\_rating}$ the electrolyte in the capacitor may breakdown, excessive leakage current and gas generation may occur, and the capacitor may fail. The MOSFET element 708, however, prevents this from occurring When the resistors 712a and 712b are selected to satisfy the following relationship:

$$V_{gs(threshold)} = \left(\frac{R_2}{R_1 + R_2}\right) * V_{capacitor\_rating}. \quad (1)$$

$V_{gs\ (threshold)}$ defines a turn on voltage for the MOSFET element 708 wherein drain to source current begins to flow, creating a shunt current path between the source 714 and the drain 718 that bypasses the capacitor 702.

The actual gate to -source voltage $V_{gs}$ experienced by the MOSFET element 708 at any given point in time satisfies the following relationship:

$$V_{gs} = \left(\frac{R_2}{R_1 + R_2}\right) * V_{capacitor}. \quad (2)$$

It is therefore evident that the MOSFET gate-to-source voltage is a function of the applied voltage $V_{capacitor}$ across the capacitor 702. Comparing Equations (1) and (2) it is evident that the MOSFET gate-to-source voltage $V_{gs}$ will be below the gate-to-source threshold value, $V_{gs\ (threshold)}$ whenever $V_{capacitor}$ is less than $V_{capacitor\_rating}$ When the capacitor 702 is placed in a series stack (FIG. 7) and the operating voltage $V_{capacitor}$ across it rises to $V_{capacitor\_rating}$ due to imbalances of capacitance values or leakage currents, the MOSFET element 708 $V_{gs\ (threshold)}$ is reached and the MOSFET turns on to shunt current around the capacitor 702 to the degree determined by gfs and the amount of imbalance or leakage in actual circuit operating conditions.

Likewise, if the capacitor 702 is used alone in a circuit (i.e., only one of the modules 704 is used and the capacitor is not connected in series with another capacitor) applied voltages $V_{capacitor}$ exceeding $V_{capacitor\_rating}$ caused the MOSFET $V_{gs\ (threshold)}$ to be reached wherein current shunted around the capacitor through the MOSFET element 708. That is, the MOSFET element 708 in the module 704 is effective to protect a single capacitor 702 as shown in FIG. 8, and when used in combination with another module 704 as shown in FIG. 7, a series stack of capacitors 702 may be protected from voltages greater than $V_{capacitor\_rating}$ for the respective capacitors 702. When $V_{capacitor\_rating}$ of the capacitors 702a and 702b in FIG. 7 are approximately equal, the voltage across the capacitors 702a and 702b is effectively balanced to a level at or below $V_{capacitor\_rating}$.

On the other hand, if the capacitor 702 in FIG. 8 operates at a voltage level $V_{capacitor}$ below its rated voltage $V_{capacitor\_rating}$, the MOSFET element 708 is essentially "off" with a drain current typically on the order of one or two microamperes. Thus, in the off state, the MOSFET element 708 creates no significant additional effective leakage current burden on the circuit using the capacitor. When used in combination with another module 704 as shown in FIG. 7 to protect and balance series stacked capacitors, the MOSFET elements 708a and 708b likewise do not detrimentally effect leakage current burden on the circuit. In the manner explained above, the MOSFET element 708 actively switches on an off to shunt leakage currents as imbalances occur and subside in the circuit, without external active elements needed to cause the switching. Rather, because the gate threshold voltage $V_{gs\ (threshold)}$ of the MOSFET element 708 is a value fixed by the construction of the MOSFET element 708, whenever the absolute value across the capacitor being protected (i.e., the absolute value of $V_{capacitor}$) causes the MOSFET $V_{gs\ (threshold)}$ to be reached, the MOSFET element 708 switches from the off state to the on state wherein the shunting current path between the MOSFET source 714 and the drain 718 is effected in the circuit.

When the modules 704 are arranged as a pair across a series pair of capacitors as shown in FIG. 7, the MOSFET elements 708 are operative to shunt or draw substantial current whenever the total value of the voltage across the capacitor pair 702a, 702b rises above a value related to the gate threshold values of the MOSFETs elements 708 comprising the pair. Consequently, and unlike the embodiments shown in FIGS. 1-3, switching operation of the active MOSFET elements 708 in the modules 704 occurs irrespective of any imbalance across the capacitor pair. That is, some voltage deviation or imbalance between the capacitors in the pair may occur, and provided that the voltages across the capacitors are below the respective $V_{capacitor\_rating}$ of the capacitors 702, $V_{gs\ (threshold)}$ of the MOSFET elements 708 in each module will not be reached and the MOSFET elements will remain in the off state. That is, in the system shown in FIG. 7, as long as the voltage across each capacitor does not exceed $V_{capacitor\_rating}$, the MOSFET elements 708 will not switch on to attempt to correct imbalances across the capacitor. Nevertheless, a balancing effect is still realized within tolerable ranges because the voltage across any one capacitor is prevented from rising above $V_{capacitor\_rating}$, and in the case of series connected modules having capacitors having the same rated voltage $V_{capacitor\_rating}$, the pair of capacitors will be balanced whenever the total voltage across the pair of capacitors is sufficiently large to cause the MOSFET elements 708 in each of the modules to simultaneously switch to the on state and shunt current around the capacitors.

Unlike the embodiments of FIGS. 1-3 wherein voltage switching is actuated by referencing the switch point to the total voltage across the capacitor pair by use of a resistor divider network, in the modules 704 shown in FIG. 8 switching is actuated instead by referencing the voltage $V_{capacitor}$ across a single capacitor 702 to the gate threshold value $V_{gs\ (threshold)}$ of the active element 708 itself. Consequently, the modules 704 shown in FIGS. 7 and 8 are fully capable of protecting individual capacitors, while the embodiments of FIGS. 1-3 require a plurality of capacitors to operate. The ability to control voltages over single capacitors for balancing and protection reasons provides for versatile adaptation of modules that may be mixed and matched to meet the needs of a large number of electrical systems, and also provides costs savings via standardized module packages as explained below.

The resistor voltage divider network including the resistors $R_1$ and $R_2$ shown in FIG. 8 is particularly advantageous when $V_{gs\ (threshold)}$ of the MOSFET element 708 in each module 704 is less than $V_{capacitor\_rating}$ of the respective capacitor 702. It may sometimes be difficult to obtain MOSFET elements 708 having certain values of $V_{gs(threshold)}$ that would otherwise be required without using the voltage divider network. That is, in some instances $V_{gs(threshold)}$ of available MOSFET elements 708 may not be large enough to shunt current around the capacitor 702 having a higher $V_{capacitor\_rating}$. Resistor values are chosen according to relationship (1) above with at least two criteria in mind: firstly that $V_{gs\ (threshold)}$ is reached when the voltage rises to or slightly above $V_{capacitor\_rating}$ and secondly that the voltage divider network itself draws very low current (less than 1 microampere in one example). The resistors 712 may be integrated with the MOSFET element 708 on a single die of silicon if desired.

For some values of $V_{capacitor\_rating}$ for the capacitor 702 being corrected, $V_{gs(threshold)}$ of the MOSFET device 708 may closely match or equal the $V_{capacitor\_rating}$ in the circuit module 704. In such a case, and as shown in FIG. 9, the voltage divider network defined by the resistors 712 shown in FIG. 8 may be eliminated, and another module 707 may be realized. In this instance, any voltage rise across the capacitor 702 in the module 707 which equals and/or exceeds $V_{gs(threshold)}$ causes drain current to flow in the amount determined by gfs and the difference $V_{gs}-V_{gs\ (threshold)}$. Therefore, the capacitor voltage may not rise much beyond the value of $V_{gs\ (threshold)}$ without causing large currents to flow. If the voltage rating of the capacitor is $V_{capacitor\_rating}$ then choosing $V_{gs\ (threshold)}$ equal to or slightly larger than $V_{capacitor\_rating}$ is optimal.

In general, MOSFET elements 708 can be designed which have the appropriate value of $V_{gs\ (threshold)}$ so that no resistor voltage divider network is needed and the module 707 of FIG. 9 is sufficient. The MOSFET element 708 may be combined with the capacitor 702 in a single package as desired, the result being a single package with two terminals for connection to other modules. FIG. 10, for example, illustrates two of the modules 707 shown in FIG. 9 being used in combination in a balancing system 720 to protect series capacitors. FIG. 11 illustrates the modules 704, 707 of FIGS. 8 and 9 being mixed and matched into a protection and balancing system 730 for series capacitors of varying voltage ratings. Some of the capacitor ratings in the system of FIG. 11 necessitate the voltage dividing network of the modules 704 while other capacitor ratings render the voltage divider network unnecessary and the modules 707 sufficient. While several example systems 700, 720, 730 are shown in FIGS. 7, 10 and 11, it is understood that the systems of FIGS. 7, 10 and 11 may include any number of modules 704 and/or 707 in actual use.

In FIGS. 7-11, the MOSFET elements 708 are illustrated as n-type MOSFETs, although it is appreciated that p-type MOSFET elements and equivalent devices may likewise be used with appropriate modification of the modules by wiring the MOSFET gate to the opposite voltage pole of the capacitor in each module. FIGS. 12-16 illustrate similar systems and modules having p-type MOSFET elements.

Figure 12:
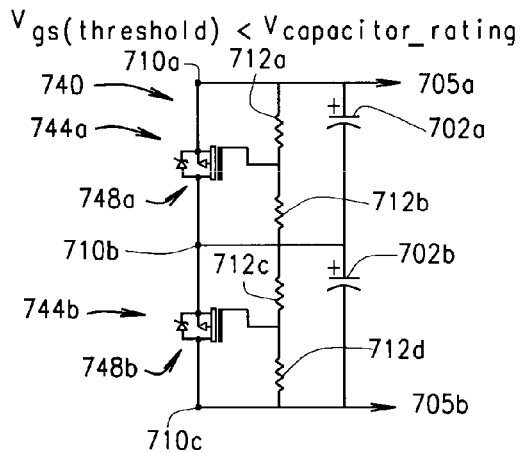
FIG. 12 illustrates another embodiment of an active balancing system that includes a plurality of capacitors coupled to multiple active balancing modules in accordance with various embodiments of the present invention.
Figure 13:
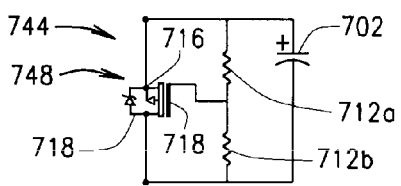
FIG. 13 illustrates an active balancing module for the system shown in FIG. 12.
Figure 14:
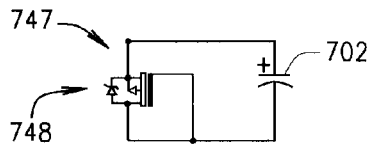
FIG. 14 illustrates another active balancing module for the system shown in FIG. 12.
Figure 15:
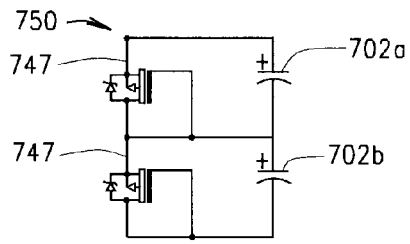
FIG. 15 illustrates an active balancing system having modules shown in FIG. 14.
Figure 16:
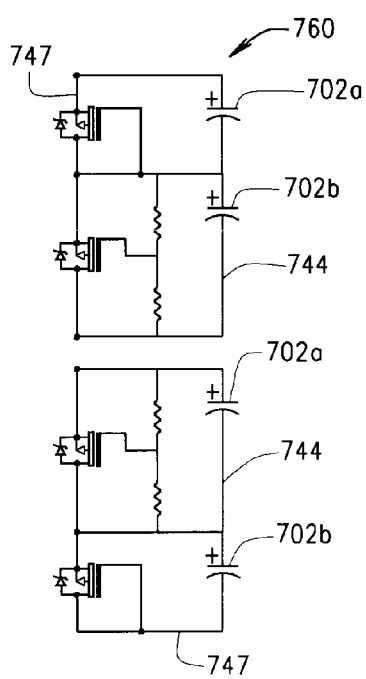
FIG. 16 illustrates an active balancing system having combinations of the modules shown in FIGS. 13 and 14.

FIGS. 12, 15 and 16 illustrate exemplary systems 740, 750 and 760 and FIGS. 13 and 14 illustrate respective modules 744, 747 wherein p-type MOSFET elements 748 are utilized in lieu of the n-type MOSFET elements 108. Like reference characters are used to identify corresponding elements of FIGS. 7-11 and FIGS. 12-16. Operationally, the balancing systems 740, 750 and 760 and modules 744 and 747 shown are identical to the modules and systems described above in relation to FIGS. 7-11 and similar benefits are provided. No further explanation of the embodiments shown in FIGS. 12-16 is therefore believed to be necessary.

The versatility of the invention is further demonstrated in FIGS. 17A and 17B wherein a balancing system 770 is provided including a combination of an n-type module 704 (FIG. 8) and a p-type module 744 (FIG. 13). Likewise, and as shown in FIGS. 18A and 18B, balancing systems 780 are provided including a combination of an n-type module 707 (FIG. 9) and a p-type module 747 (FIG. 14).

FIG. 19 illustrates another embodiment of an active balancing module 790 that resembles the system 770 shown in FIG. 17B except that resistors 712b and 712c are combined into a single resistor 712e, and the source nodes of the n-type MOSFET element 708 and the source node of the p-type MOSFET element 748 are connected in common. In such an embodiment, operation of the MOSFET elements 708 and 748 is referenced to a floating reference voltage across the resistor 712e and corresponding to the voltage difference between the capacitor pair, and the system 790 is therefore responsive to imbalance voltages between the series capacitors 702a and 702b. That is, the MOSFET elements 708 and 748 are responsive to absolute voltage values across the capacitors as explained above, and are also responsive to voltage imbalances across the capacitor pair to shunt current around the capacitors and equalize imbalances once they exceed $V_{gs\ (threshold)}$ for the respective MOSFET elements. A resistance value for resistor 712e may be strategically selected to vary the sensitivity of the module to imbalances across the pair of capacitors. The module 790 is equally effective for capacitors 702a, 702b of the same or different voltage rating.

FIG. 20 illustrates an active balancing system 800 having two modules 790 connected to one another to protect and balance a series stack of capacitors 702a, 702b, 702c, 702d. Additional modules 790 could be provided as desired to protect additional capacitors in the stack.

FIG. 21 illustrates a balancing system 810 that is essentially a plurality of modules 707 connected in parallel to one another, forming a network of parallel connected capacitors 702a, 702b, 702c and an-n-type MOSFET element 708 connected to each respective capacitor 702a, 702b, 702c. Connected as such, the MOSFET elements 708 are operative as explained above to switch on and shunt overvoltage surges across the parallel capacitors when the voltage across the capacitors approaches $V_{gs\ (threshold)}$ of the respective MOSFET elements. The system 810 is therefore well suited to prevent and/or mitigate damage to the capacitors 702a, 702b, 702c that are associated with high current charging sources (not shown). The capacitors may have the same or different voltage ratings with $V_{gs\ (threshold)}$ of the MOSFET elements 708 matching the voltage ratings of the respective capacitors.

While n-type MOSFET elements 708 are illustrated, it is understood that p-type MOSFET elements and equivalent devices may likewise be employed with certain wiring modifications described above.

FIG. 22 illustrates an alternative balancing system 820 to the system 810 of FIG. 21, wherein the three parallel capacitors 702a, 702b, 702c are protected by a single N-type MOSFET element 708. The MOSFET element 708 may be selected to provide high current and power dissipation capability, and is packaged appropriately to dissipate heat in an overvoltage event. $V_{gs\ (threshold)}$ of the MOSFET element is selected to match the voltage ratings of the capacitors 702a, 702b, 702c as described above. While three capacitors 702a, 702b, 702c are illustrated in FIG. 22, it is understood that greater or fewer numbers of capacitors could be provided and be operatively connected to the MOSFET element 708. While n-type MOSFET elements 708 are illustrated in the system 820, it is understood that p-type MOSFET elements and equivalent devices may likewise be employed.

FIG. 23 illustrates a capacitor protection system that is essentially a plurality of modules 704 (FIG. 8) connected in parallel to one another, forming a network of parallel connected capacitors 702a, 702b and an n-type MOSFET element 708 connected to each respective capacitor 702a, 702b. The modules 704 include the voltage divider networks as described above to accommodate higher voltage ratings for the capacitors 702a, 702b. Connected as such, the MOSFET elements 708 are operative as explained above to switch on and shunt overvoltage surges across the parallel capacitors 702a, 702b when the voltage across the capacitors approaches $V_{gs\ (threshold)}$ of the respective MOSFET elements. The system 810 is therefore well suited to prevent and/or mitigate damage to the capacitors 702a, 702b, 702c that are associated with high current charging sources (not shown). The capacitors 702a, 702b, 702c may have the same or different voltage ratings and the values for the resistor elements 712a and 712b are chosen to satisfy Equation (1) set forth above. While n-type MOSFET elements 708 are illustrated in the system 830, it is understood that p-type MOSFET elements and equivalent devices may likewise be employed.

FIG. 24 illustrates an alternative balancing system 840 to the system 830 shown in FIG. 23, wherein two parallel capacitors 702a, 702b, are protected by a single N-type MOSFET element 708. The MOSFET element 708 may be selected to provide high current and power dissipation capability, and may be packaged appropriately to dissipate heat in an overvoltage event. $V_{gs\ (threshold)}$ of the MOSFET element and values of $R_1$ and $R_2$ are selected to satisfy Equation (1) above. While two capacitors 702a, 702b are illustrated in FIG. 24, it is understood that greater or fewer numbers of capacitors could be provided and be operatively connected to the MOSFET element 708. While n-type MOSFET elements 708 are illustrated in the system 840, it is understood that p-type MOSFET elements and equivalent devices may likewise be employed.

FIGS. 25A, 25B, 25C, 25D illustrate further embodiments of protection modules 850, 860, 870, 880 that are adaptations of the module 707 (FIG. 9) including auxiliary devices connected in series with the active elements for enhanced operation of the modules. The auxiliary devices modify the effective turn on voltage to establish the shunt current path.

The module 850 illustrated in FIG. 25A is essentially the module 707 with the addition of an auxiliary device in the form of a diode 852 connected between the negative terminal of the capacitor 702 and the source of an n-type MOSFET element 708. Due to the addition of the diode 852 in the circuit, turn on voltage at which shunt current begins to flow through the MOSFET element 708 is equal to the $V_{gs\ (threshold)}$ of the MOSFET element plus the forward voltage drop of the diode 852. While the module 850 is illustrated with an n-type MOSFET element 708, it is understood that a p-type MOSFET element may likewise be provided as described above with appropriate wiring modifications to the circuit.

FIG. 25B illustrates another module 860 having first and second Schottky diodes 852, 854 connected between the negative terminal of the capacitor 702 and the source of an n-type MOSFET element 708. Due to the addition of the diodes 852 and 854 in the circuit, the turn on voltage at which shunt current begins to flow through the MOSFET element 708 is equal to the $V_{gs\ (threshold)}$ of the MOSFET element plus the sum of the forward voltage drops of the diodes 852 and 854. Greater numbers of diodes may be provided if desired, and while the module 860 is illustrated with an n-type MOSFET element 708, it is understood that a p-type MOSFET element may likewise be provided as described above with appropriate wiring modifications to the circuit.

FIG. 25C illustrates a module 870 having an auxiliary device in the form of a transistor 856 connected between the negative terminal of the capacitor 702 and the source of the n-type MOSFET element 708. Due to the addition of the transistor 852 in the circuit, the turn on voltage at which shunt current begins to flow is equal to the $V_{gs\ (threshold)}$ of the MOSFET element plus the base-emitter diode voltage drop of the transistor 856. While the module 870 is illustrated with an n-type MOSFET element 708, it is understood that a p-type MOSFET element may likewise be provided as described above with appropriate wiring modifications to the circuit.

FIG. 25D illustrates another module 880 having first and second transistors in a cascaded arrangement 858 that is sometimes referred to as a Darlington arrangement. The cascaded transistors are connected between the negative terminal of the capacitor 702 and the n-type MOSFET element 708. Due to the addition of the cascaded transistors in the circuit, the turn on voltage at which shunt current begins to flow through the MOSFET element 708 is equal to the $V_{gs\ (threshold)}$ of the MOSFET element plus the base-emitter diode voltage drop of the cascaded transistors. Greater numbers of transistors may be provided if desired, and while the module 880 is illustrated with an n-type MOSFET element 708, it is understood that a p-type MOSFET element may likewise be provided as described above with appropriate wiring modifications to the circuit.

FIGS. 26A, 26B, 26C, 26D illustrate further embodiments of protection modules 890, 900, 910, 920 that are adaptations of the module 704 (FIG. 8) including auxiliary devices for enhanced operation thereof.

The module 890 illustrated in FIG. 26A is essentially the module 704 with the addition of an auxiliary device in the form of a diode 892 connected between the negative terminal of the capacitor 702 and the source of the n-type MOSFET element 708. Due to the addition of the diode 892 in the circuit, turn on voltage at which shunt current begins to flow is equal to the product of $V_{gs\ (threshold)}$ of the MOSFET element and the voltage divider network ratio expressed in Equation (1) above element plus the forward voltage drop of the diode 852. While the module 890 is illustrated with an n-type MOSFET element 708, it is understood that a p-type MOSFET element may likewise be provided as described above with appropriate wiring modifications to the circuit.

FIG. 26B illustrates another module 900 having first and second Schottky diodes 892, 894 connected between the negative terminal of the capacitor 702 and the source of the n-type MOSFET element 708. Due to the addition of the diodes 892 and 884 in the circuit, the turn on voltage at which shunt current begins to flow is equal to the product of $V_{gs\ (threshold)}$ of the MOSFET element and the voltage divider network ratio expressed in Equation (1) above plus the forward voltage drop of the diodes 892 and 894. Greater numbers of diodes may be provided if desired, and while the module 900 is illustrated with an n-type MOSFET element 708, it is understood that a p-type MOSFET element may likewise be provided as described above with appropriate wiring modifications to the circuit.

FIG. 26C illustrates a module 910 having an auxiliary device in the form of a transistor 896 connected between the negative terminal of the capacitor 702.and the source of the n-type MOSFET element 708. Due to the addition of the transistor 896 in the circuit, the turn on voltage at which shunt current begins to flow is equal to the product of $V_{gs\ (threshold)}$ of the MOSFET element and the voltage divider network ratio expressed in Equation (1) above plus the base-emitter diode voltage drop of the transistor 896. While the module 910 is illustrated with an n-type MOSFET element 708, it is understood that a p-type MOSFET element may likewise be provided as described above with appropriate wiring modifications to the circuit.

FIG. 26D illustrates another module 920 having first and second transistors in a cascaded arrangement 898 that is sometimes referred to as a Darlington arrangement. The cascaded transistors are connected between the negative terminal of the capacitor 702 and the n-type MOSFET element 708. Due to the addition of the cascaded transistors in the circuit, the turn on voltage at which shunt current begins to flow is equal to the product of $V_{gs\ (threshold)}$ of the MOSFET element and the voltage divider network ratio expressed in Equation (1) plus the base-emitter diode voltage drop of the cascaded transistors. Greater numbers of transistors may be provided if desired, and while the module 920 is illustrated with an n-type MOSFET element 708, it is understood that a p-type MOSFET element may likewise be provided as described above with appropriate wiring modifications to the circuit.

Figure 27:
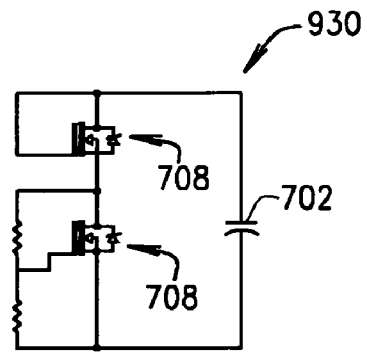
FIG. 27 illustrates another protection circuit with an auxiliary device.

FIG. 27 illustrates another embodiment of a capacitor protection and balancing module 930 that, unlike the previously described embodiments, includes a pair of n-type MOSFET elements corresponding to a single capacitor 702. That is, instead of a one-to-one correspondence between MOSFET elements and capacitors being protected, the module 930 employs a second MOSFET element 708 as an auxiliary device to modify the turn on voltage at which shunt current begins to flow. As shown in FIG. 27, one of the MOSFET elements 708 is connected to a voltage divider network including resistors $R_1$ and $R_2$ while the other of the MOSFET elements 708 is a stand alone active element.

Due to the addition of the second MOSFET element 108 in the circuit, the turn on voltage at which shunt current begins to flow is equal to sum of $V_{gs\ (threshold)}$ of the stand alone MOSFET element plus the product of the $V_{gs\ (threshold)}$ of the second MOSFET element and the voltage divider network ratio as expressed in Equation (1). Greater numbers of MOSFET elements may be provided if desired, and while the module 930 is illustrated with n-type MOSFET elements 708, it is understood that p-type MOSFET elements and equivalent devices may likewise be provided as described above with appropriate wiring modifications to the circuit. Various combinations of MOSFET elements in the module may be provided with and without voltage divider networks as desired.

Having now described various examples of modules having auxiliary devices such as diodes, transistors, and additional MOSFET elements shown in FIGS. 25, 26 and 27, it should be understood that other auxiliary devices may likewise be utilized to alter the performance of the modules by combining two turn-on voltage characteristics (e.g., the turn on voltage of the MOSFET element and the turn on voltage of the auxiliary device) resulting in a current "turn on" when the voltage rises to the sum of the two. The behavior of the modules may therefore be tailored for specific capacitor meetings and desired effects.

Using the circuit modules described above, capacitors may be protected in a stand alone application, capacitors may be protected in a series stack, and capacitors may even be protected in parallel. Modules of varying types may be provided and used singly or may be combined into protection and balancing systems for a wide range of capacitor arrangements, and characteristics of the resistors, MOSFET elements, and auxiliary devices may be selected to achieve a wide variety of performance characteristics in use.

V. Capacitor Module Integration and Packaging

Figure 28:
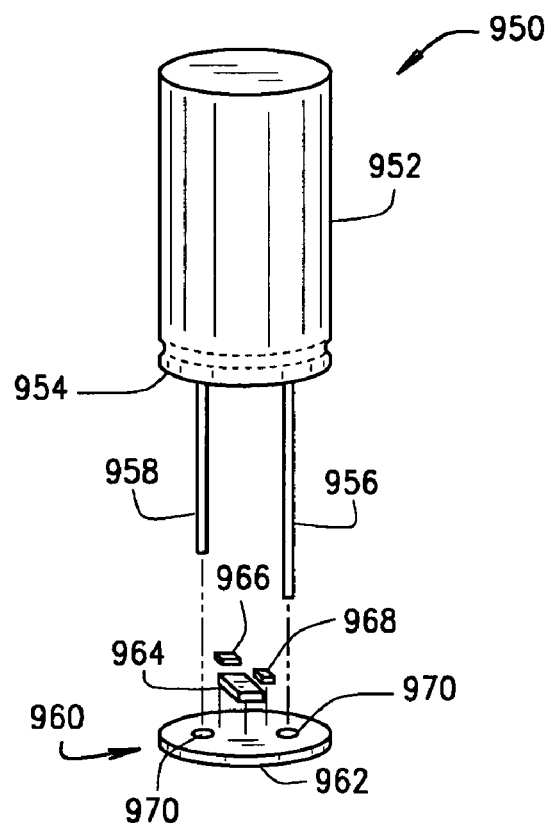
FIG. 28 is an exploded view of an exemplary balancing module integrated into a capacitor device.

FIG. 28 is an exploded view of an exemplary balancing module integrated into a capacitor device 950. In an illustrative embodiment, the device 950 includes a capacitor housing 952 packed with electrolytic materials in a known manner. A compressible bung sealing element 954, fabricated from rubber or other compressible material, is fitted to one end of the housing 952 and forms a compression seal on the end of the housing 952 to protect the electrolytic material and operative components of the capacitor within. Connecting terminals or leads 956, 958 extend from the housing 952 to external circuitry in a known manner. In the illustrative embodiment shown in FIG. 28, the housing 952 is a cylindrical housing, sometimes referred to as a can, that is commonly used in supercapacitor designs, although housings 952 of various shapes and configurations may alternatively be used.

An active component assembly 960 is provided including a dielectric substrate 962, such as a ceramic substrate material, printed circuit board material, FR-4 board, phenolic or other polymer-based material. A MOSFET element 964 and associated components 966, 968 are mounted to the substrate 962 via, for example, a known soldering operation. Through-holes 970 are provided in the substrate 962, and the capacitor leads 956, 958 are extended through the through-holes and the leads 956, 958 are connected to the MOSFET element 964 and components 966, 968. The MOSFET element 964 may be an n-type or p-type element, and the components 966, 968 may be resistors or auxiliary devices as explained above, or optionally may be omitted. That is, the active element 964 and the components 966, 968 in the component assembly 960 may be selected and arranged to realize any of the modules described above when the assembly 960 is connected to the capacitor leads 956, 958.

The active element 964 and the components 966, 968 may be mounted to the top and/or bottom surface of the substrate 962 to complete the assembly 960, and the assembly 960 may be slid over the leads 956, 958 with the leads 956, 958 extending through the through holes 970 until the assembly 960 rests against the bung seal 954. The leads 956, 958 may then be soldered to the assembly 960 so that the active component assembly 960 is permanently mounted to and fully integrated with the device 950. In such a manner, existing capacitors may be fitted with the active component assembly 960 to provide the circuit protection and balancing functionality of the modules described above. The active component assembly 960 may be retrofitted to off the shelve capacitors without impacting the construction or design of the capacitor products themselves.

While the component assembly 960 thus far described is located external to the housing 952 in an abutting relationship to an exterior surface of the bung seal 954, the active component assembly may alternatively be located internal to the capacitor housing 952 and connected to the terminal leads 956, 958 prior to installation of the rubber bung seal 954 into the housing 952. Of course, locating the assembly 960 interior to the housing 952 entails some consideration of, and most likely some alteration of the internal construction and design of the capacitor device that those in the art would no doubt appreciate. It is believed that such consideration and potential alteration of the capacitor construction is within the level of ordinary skill in the art and no further explanation is believed to be necessary.

Figure 29:
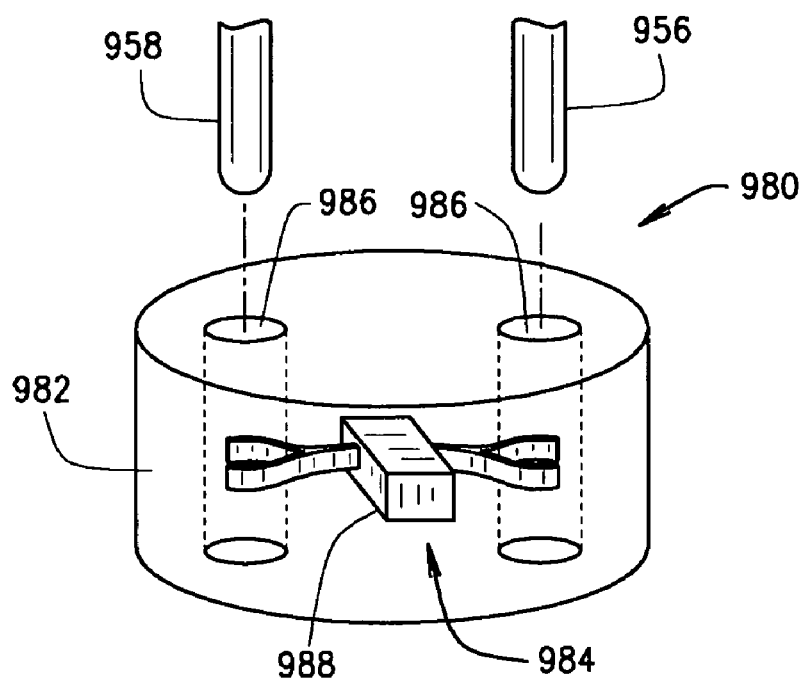
FIG. 29 illustrates an active component assembly for a capacitor device integrated with a balancing module.
Figure 30:
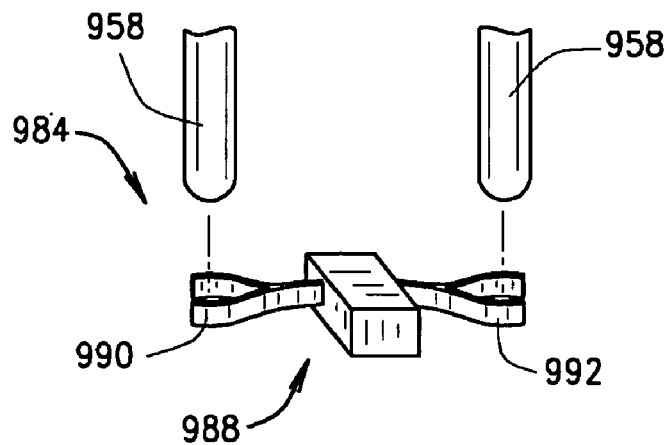
FIG. 30 illustrates a component subassembly for the assembly shown in FIG. 29.

FIGS. 29 and 30 illustrate an active component assembly 980 having a compressible bung seal 982 that is molded around an active element assembly 984. The active element assembly 984 is embedded in or encapsulated in the compressible material of the bung seal 984, and the bung seal 982 is formed with through holes 986. Capacitor leads, such as the leads 956, 958 shown in FIG. 28, may be extended through the through-holes 986 as the bung seal 984 is installed to the capacitor housing, such as the housing 952 shown in FIG. 28. The active element assembly 984 includes a MOSFET package 988, and resilient terminal elements 990, 992 extending from the package 988. In one embodiment, the terminal elements 990, 992 are deflectable spring contacts that are clamped to the capacitor leads 956, 958 by compressive forces in the bung seal 982 as it is installed to the capacitor housing. Electrical connection of the MOSFET package 988 is therefore established to the capacitor leads 956, 958, and the package 988 is permanently mounted to and fully integrated into the capacitor device.

The MOSFET package 988 may include an n-type or p-type active element, and any resistors or auxiliary components desired to effectuate any of the circuit modules described above. It is understood that the active component assembly 984 may alternatively be located internal to the capacitor housing apart from the bung seal 982 and connected to the terminal leads 956, 958 prior to installation of the bung seal 982. Of course, locating the assembly 984 interior to the capacitor housing entails some consideration of, and most likely some alteration of the internal construction and design of the capacitor device that those in the art would no doubt appreciate. It is believed that such consideration and potential alteration of the capacitor construction is within the level of ordinary skill in the art and no further explanation is believed to be necessary.

Figure 31:
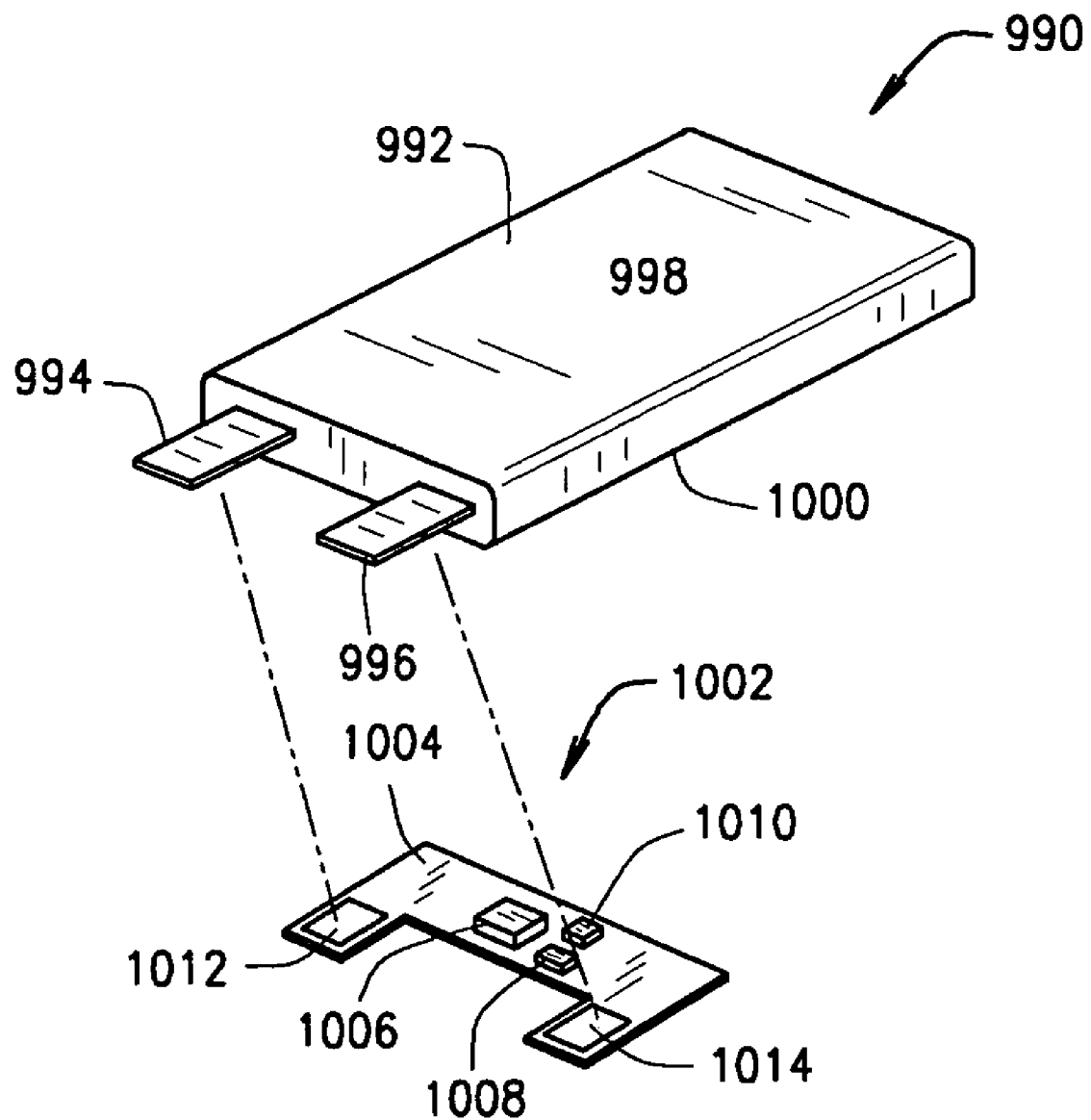
FIG. 31 is an exploded view of an alternative embodiment of an exemplary balancing module integrated into a capacitor device.

FIG. 31 is an exploded view of an alternative embodiment of an exemplary balancing module integrated into a capacitor device 990. The device 990 includes a capacitor housing 992 packed with an electrolytic material in a known manner. Connecting terminals 994, 996 extend from the housing 992 to external circuitry in a known manner. In the illustrative embodiment shown in FIG. 31, the housing 992 is an elongated housing having opposing flat sides 998 and 1000 although housings of various shapes and configurations may alternatively be employed.

An active component assembly 1002 is provided including a dielectric substrate 1004 that in an exemplary embodiment may be a flexible circuit board material, although the substrate may alternatively be fabricated from ceramic substrate material, printed circuit board materials, FR-4 board, phenolic or other polymer-based material if desired. A MOSFET element 1006 and associated components 1008, 1010 are mounted to the substrate 1004 via, for example, a known soldering operation. The MOSFET element 1006 may be an n-type or p-type element, and the components 1008, 1010 may be resistors or auxiliary devices as explained above, or optionally may be omitted. That is, the active element 1006 and the components 1008, 1010 in the component assembly 1002 may be selected and arranged to construct any of the modules described above when the assembly 1002 is connected to the capacitor terminals 994, 996.

In the illustrative embodiment shown in FIG. 31, the flexible substrate material 1004 includes conductive traces interconnecting the MOSFET element 1006 and the components 1008, 1010, and surface mount pads 1012, 1014 are provided on opposing ends of the substrate material 1004. The surface mount pads 1012, 1014 may be soldered to surfaces of the terminals 994, 996 so that the active component assembly 1002 is permanently mounted to and fully integrated with the device 990. In such a manner, existing capacitors may be fitted with the active component assembly 1002 to provide the circuit protection and balancing functionality of the modules described above. The active component assembly 1002 may be retrofitted to off the shelve capacitors without impacting the construction or design of the capacitor products themselves.

While the component assembly 1002 thus far described is located external to the housing 992 and electrically connected to the terminals 994, 996 at a location exterior to the capacitor housing, the active component assembly 1002 may alternatively be located internal to the capacitor housing 992 and connected to the terminals 994, 996 at a location internal to the housing 992. Of course, locating the assembly 1002 interior to the housing 992 entails some consideration of, and most likely some alteration of the internal construction and design of the capacitor device that those in the art would no doubt appreciate. It is believed that such consideration and potential alteration of the capacitor construction is within the level of ordinary skill in the art and no further explanation is believed to be necessary.

VI. Conclusion

Various capacitor protection and balancing modules, systems and capacitor devices with integrated protection and balancing features have been disclosed that provide protection for single capacitors, and balancing and protection of series stacked capacitors and parallel capacitors. The modules, systems and capacitor devices may be provided at relatively low cost, and may be combined with one another in a versatile and highly adaptable manner to reliably protect a wide range of capacitor systems that conventional balancing devices, systems, and capacitor devices simply may not achieve. While the modules, systems and devices described herein are believed to particularly advantageous for supercapacitor products and DC topologies, it is understood that the benefits of the invention may accrue to other capacitor types and circuit topologies as well.

While the invention has been described in terms of various specific embodiments, those skilled in the art will recognize that the invention can be practiced with modification within the spirit and scope of the claims.

What is claimed is:

1. A capacitor protection and balancing circuit module, comprising:
   a capacitor having a first terminal and s second terminal and
   an active MOSFET element connected across the first and second terminals, the active MOSFET element configured for self switching from an off state to an on state in response to an absolute voltage value across the capacitor exceeding a predetermined voltage threshold corresponding to a voltage rating of the capacitor, the active MOSFET element defining a shunt current path around the capacitor when in the on state and preventing the voltage across the capacitor from exceeding the voltage rating.

2. The module of claim 1, wherein the active MOSFET element has a turn on voltage causing the active MOSFET element to switch between the on state and the off state, the module further comprising a voltage divider network connected to the active MOSFET element, the voltage divider network including a resistor $R_1$ and a resistor $R_2$, the turn on voltage being governed by the relationship:

$$V_{gs(threshold)} = \left(\frac{R_2}{R_1 + R_2}\right) * V_{capacitor\_rating}$$

whereby a shunt current begins to flow around the capacitor when the predetermined voltage threshold is exceeded.

3. The module of claim 1, wherein the active MOSFET element has a first turn on voltage causing the active MOSFET element to switch between the on state and the and the off state, the module further comprising an auxiliary device connected in series with the active MOSFET element, the auxiliary device having a second turn on voltage causing the auxiliary device to switch between an off state and an on state, whereby current flows through the shunt current path when the absolute voltage value across the capacitor exceeds the sum of the first turn on voltage and the second turn on voltage.

4. The module system of claim 3, wherein the auxiliary device is one of a transistor, a diode, a MOSFET element, and equivalents thereof 5. A capacitor protection and balancing circuit module, comprising:
a capacitor device having a first terminal and a second terminal; and
means for controlling an absolute voltage across the first and second terminals, the means for controlling being connected across the first and second terminals, the means for controlling being inductor free and self switching from an off state to an on state solely in response to absolute voltage values placed across the first and second terminals that exceed a voltage rating of the capacitor device, the means for controlling defining a shunt current path around the capacitor device when in the on state and preventing the absolute voltage across the capacitor device from exceeding the voltage rating.

6. The module of claim 5, wherein the means for controlling is permanently mounted to the capacitor device.

7. The module of claim 5, wherein the means for controlling is assembled to the capacitor device.

8. The module of claim 5, wherein the capacitor device includes a housing, and the means for controlling is attached to the first and second terminals at a location exterior to the housing.

9. The module of claim 5, further comprising a second capacitor device coupled in series to the capacitor device, and wherein the means for controlling is responsive to a voltage imbalance across the capacitor device and the second capacitor device.

10. A capacitor device; comprising:
a capacitor housing;
a plurality of terminal elements extending from said housing; and
an active component assembly mounted to the plurality of terminal elements and operatively connected to the plurality of terminal elements, the active component assembly comprising an active element defining a shunt current path, the active element being self switching for controlling the shunt current path in response to an absolute voltage value occurring across the plurality of terminal elements and maintaining voltage across the plurality of terminal elements to a level below a voltage rating for the capacitor device.

11. A capacitor device in accordance with claim 10, further comprising a compressible seal element engaged to the capacitor housing, the active component assembly being embedded within the compressible seal element.

12. A capacitor device in accordance with claim 10, wherein the active element is mounted to a substrate, the substrate including at least one surface mount pad connecting the active element between the plurality of terminal elements.

13. A capacitor device in accordance with claim 10, wherein the plurality of terminal elements comprise terminal leads, the active element comprising deflectable contacts clamped to the terminal leads.

14. A capacitor device in accordance with claim 10, wherein the active element is mounted to a substrate, the substrate including at least one through-hole and the plurality of terminal elements pass through the at least one through-hole and are connected to the active element.

15. A capacitor device in accordance with claim 10, wherein the active element comprises at least one device selected from the group consisting of a MOSFET element, a transistor element, a diode element, and equivalents and combinations thereof 16. A capacitor device in accordance with claim 10 wherein the capacitor device is a supercapacitor.

17. A capacitor protection and balancing system, comprising:
at least one circuit module comprising:
at least one capacitor; and
an active element connected in parallel to the at least one capacitor, the active element defining a shunt current path around the at least one capacitor when in an on state.

18. The system of claim 17, wherein the at least one capacitor comprises a pair of capacitors connected in a series arrangement,
wherein the at least one circuit module further comprises:
a first terminal configured for connection to a positive plate of the first capacitor;
a second terminal configured for connection to a negative plate of the first capacitor and to a positive plate of the second capacitor; and
a third terminal configured for connection to a negative plate of the second capacitor; and
wherein the active element is integrated between the first, second, and third terminals and adapted to substantially balance the voltage imbalances between the pair of capacitors, the active element having power connections to the first and third terminals.

19. The system of claim 18, wherein the active element comprises a first MOSFET element and second MOSFET element each associated with one of the pair of capacitors.

20. The system of claim 18, wherein the active element is responsive to an absolute voltage value placed across the respective capacitors in the pair of capacitors.

21. The system of claim 18, wherein the active element is responsive to a floating reference voltage related to an imbalance between the respective capacitors in the pair of capacitors.

22. The system of claim 18, wherein the active element comprises first and second active elements each associated with one of the pair of capacitors, said active elements each adapted to shunt current around the respective capacitors in the pair of capacitors when a voltage across the respective capacitors exceeds a predetermined threshold.

23. The system of claim 18, wherein the active element comprises at least one MOSFET element, the MOSFET element having a turn on voltage threshold that is approximately equal to a voltage rating for each capacitor in the pair of capacitors.

24. The system of claim 18, wherein the active element comprises first and second devices each associated with one of the pair of capacitors, each of the first and second devices having a turn on voltage in which the device switches from an off state to an on state, the first and second devices defining a shunt current path around at least one of the capacitors in the pair of capacitors when a voltage across the capacitor exceeds the sum of the turn on voltages of the first and second devices.

25. The system of claim 24, wherein the first device comprises a MOSFET element.

26. The system of claim 24, wherein the second device is one of a MOSFET element, a diode, and a transistor.

27. The system of claim 18, wherein the active element comprises first and second active elements each associated with one of the pair of capacitors, and only one of the active elements is connected to a voltage divider network.

28. The system of claim 18, wherein the active element comprises first and second active elements each associated with one of the pair of capacitors, one of the active elements being an n-type MOSFET element, and the other of the active elements being a p-type MOSFET element.

29. The system of claim 18, wherein the active element controls voltage across the respective capacitor in the pair of capacitors.

30. The system of claim 29, wherein the active element in each of the at least one circuit module is self-switching from an off state to the on state when a voltage across the respective capacitor in the pair of capacitors exceeds a predetermined threshold.

31. The system of claim 29, wherein the active element in the at least one circuit module is connected to at least one surface mount pad on a substrate, the at least one surface mount pad being surface mounted to two of the first, second and third terminals.

32. The system of claim 29, wherein the active element in the at least one circuit module is mounted to a substrate, the substrate including at least one through-hole receiving two of the first, second, and third terminals.

33. The system of claim 17, wherein the at least one capacitor comprises a first terminal and a second terminal; and
wherein the active element is connected across the first and second terminals, the active element switching from an off state to the on state in response to an absolute voltage value across the at least one capacitor exceeding a predetermined voltage threshold.

34. The system of claim 33, wherein the active element is a MOSFET element.

35. The system of claim 33, wherein the active element is self switching between the on state and the off state.

36. The system of claim 33, wherein the active element has a turn on voltage causing the active element to switch between the on state and the off state, the turn on voltage matching the predetermined voltage threshold.

37. The system of claim 33, wherein the at least one capacitor has a voltage rating and the active element has a turn on voltage causing the active element to switch between the on state and the off state, the system further comprising a voltage divider network connected to the active element, the divider network including a resistor $R_1$ and a resistor $R_2$, the turn on voltage being selected according to the relationship:

$$V_{gs(threshold)} = \left(\frac{R_2}{R_1 + R_2}\right) * V_{capacitor\_rating}.$$

whereby a shunt current begins to flow around the at least one capacitor when the predetermined voltage threshold is exceeded.

38. The system of claim 33, wherein the active element has a first turn on voltage causing the active element to switch between the on state and the off state, the system further comprising an auxiliary device connected in series with the active element, the auxiliary device having a second turn on voltage causing the auxiliary device to switch between an off state and an on state, whereby current flows through the shunt current path when the absolute voltage value across the at least one capacitor exceeds the sum of the first turn on voltage and the second turn on voltage.

39. The system of claim 33, further comprising a second circuit module having at least one capacitor and an active element, the at least one capacitor of the second circuit module being connected in series with the at least one capacitor of the at least one circuit module.

40. The system of claim 33, further comprising a second circuit module having at least one capacitor and an active element, the at least one capacitor of the second circuit module being connected in parallel with the at least one capacitor of the at least one circuit module.

41. The system of claim 33, further comprising a second circuit module having at least one capacitor and an active element, the active element of the second circuit module being different from the active element of the at least one circuit module.

42. The system of claim 41, wherein the at least one capacitor of the second circuit module and the at least one capacitor of the at least one circuit module have different voltage ratings.

43. The system of claim 41, wherein the active element of the second circuit module and the active element of the at least one circuit module have different turn on voltages.

44. The system of claim 41, wherein the active element of the second circuit module is an n-type MOSFET element, and the active element of the at least one circuit module is a p-type MOSFET element.

45. The system of claim 33, further comprising a second capacitor pair connected in series with the at least one capacitor of the at least one circuit module, and a second active element connected in series with the active element of the at least one circuit module, the second active element also defining a shunt current path around the second capacitor pair, and the first and second active elements switching to the on state in response to a voltage imbalance across the second capacitor pair.

46. The system of claim 33, wherein the at least one capacitor comprises first and second capacitors connected in parallel.

* * * * *